(12) United States Patent
Charache et al.

(10) Patent No.: US 11,460,343 B2
(45) Date of Patent: Oct. 4, 2022

(54) METHOD FOR SELECTION OF RAMAN EXCITATION WAVELENGTHS IN MULTI-SOURCE RAMAN PROBE

(71) Applicant: Innovative Photonic Solutions, Inc., Monmouth Junction, NJ (US)

(72) Inventors: Greg W. Charache, East Windsor, NJ (US); Scott L. Rudder, Hopewell, NJ (US)

(73) Assignee: Innovative Photonic Solutions, Inc., Plainsboro, NJ (US)

( * ) Notice: Subject to any disclaimer, the term of this patent is extended or adjusted under 35 U.S.C. 154(b) by 0 days.

(21) Appl. No.: 17/198,173

(22) Filed: Mar. 10, 2021

(65) Prior Publication Data
US 2021/0302233 A1    Sep. 30, 2021

Related U.S. Application Data

(63) Continuation-in-part of application No. 16/831,611, filed on Mar. 26, 2020, now Pat. No. 11,067,512.

(51) Int. Cl.
*G01J 3/44* (2006.01)
*G01J 3/02* (2006.01)
*G01J 3/10* (2006.01)

(52) U.S. Cl.
CPC ............... *G01J 3/44* (2013.01); *G01J 3/0208* (2013.01); *G01J 3/0218* (2013.01); *G01J 3/10* (2013.01); *G01J 2003/104* (2013.01)

(58) Field of Classification Search
CPC ......... G01N 21/65; G01N 2201/06113; G01N 2201/0636; G01J 3/44
See application file for complete search history.

(56) References Cited

U.S. PATENT DOCUMENTS

| 6,124,928 | A | 9/2000 | Slater |
| 9,059,555 | B2 | 6/2015 | Connolly |
| 9,577,409 | B1 | 2/2017 | Connolly |
| 10,359,313 | B1 | 7/2019 | Rudder |
| 11,067,512 | B1 * | 7/2021 | Charache ............... G01N 21/65 |

OTHER PUBLICATIONS

"Spatially Compressed Dual-Wavelngth Excitation Raman Spectromerter," Cooper, J. B,. Optical Society of America, 2014.
"Dual-Wavelength Raman Spectroscopy: Improved Compactness and Spectral Resolution", Kiefer, J., American Pharmaceutical Review, 2018.
Laura E. Masson, Christina M. O'Brien, et. al, Dual Excitation Wavelength System for Combined Fingerprint and High Wavenumber Raman Spectroscopy, Analyst 2018, 143 pp. 6049-6080.
European Search Report issued in response to foreign counterpart application, dated Jan. 21, 2021.

* cited by examiner

*Primary Examiner* — Abdullahi Nur
(74) *Attorney, Agent, or Firm* — Law Office of Carl Giordano, PC

(57) ABSTRACT

A method is disclosed for providing enhanced quantitative analysis of materials by a dual-laser Raman probe wherein the wavelengths of the lasers used to illuminate a target object are selected in a manner to improve and enhance the quantitative analysis performance of the Raman signals.

19 Claims, 15 Drawing Sheets

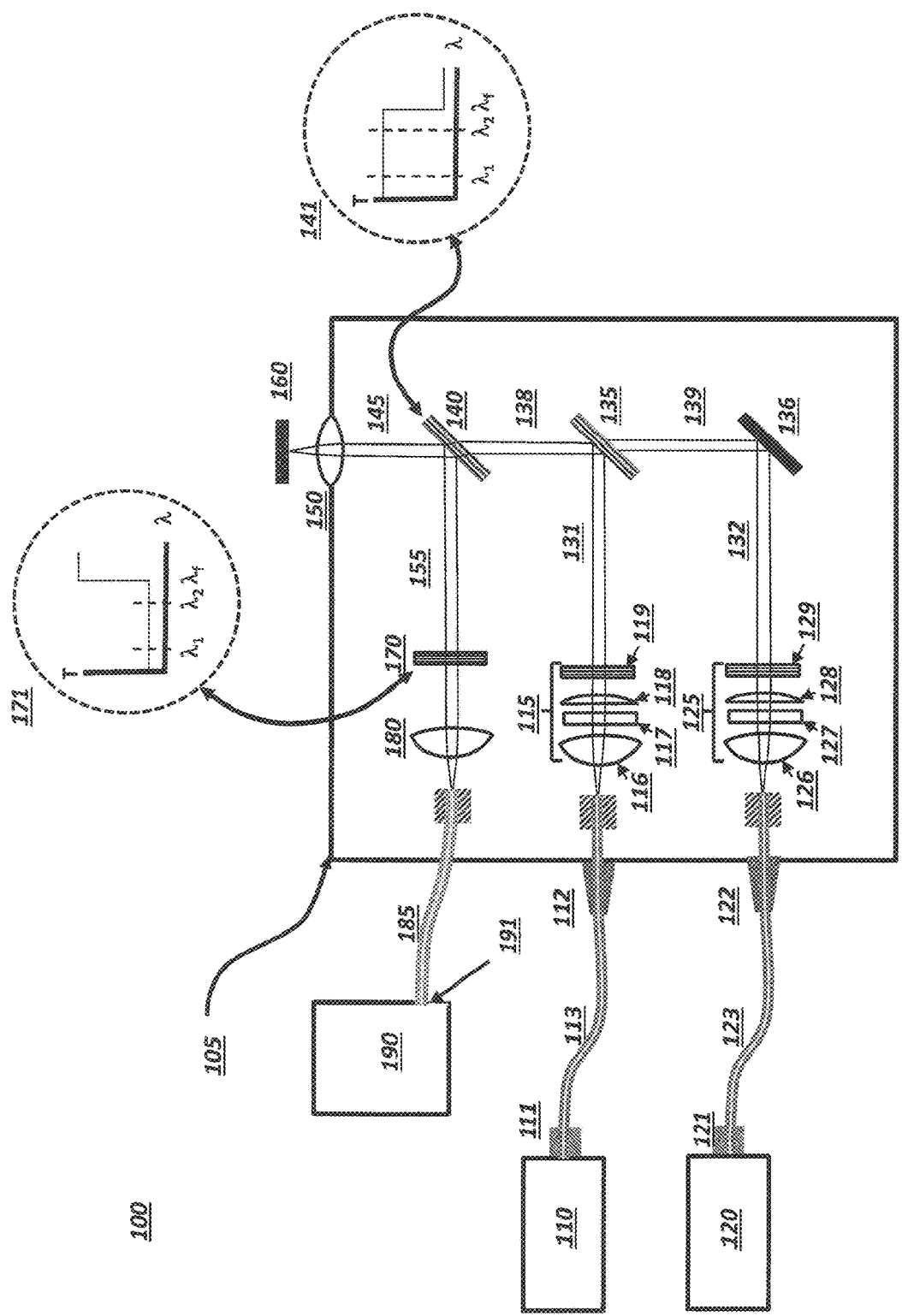
FIG. 1A – Prior Art

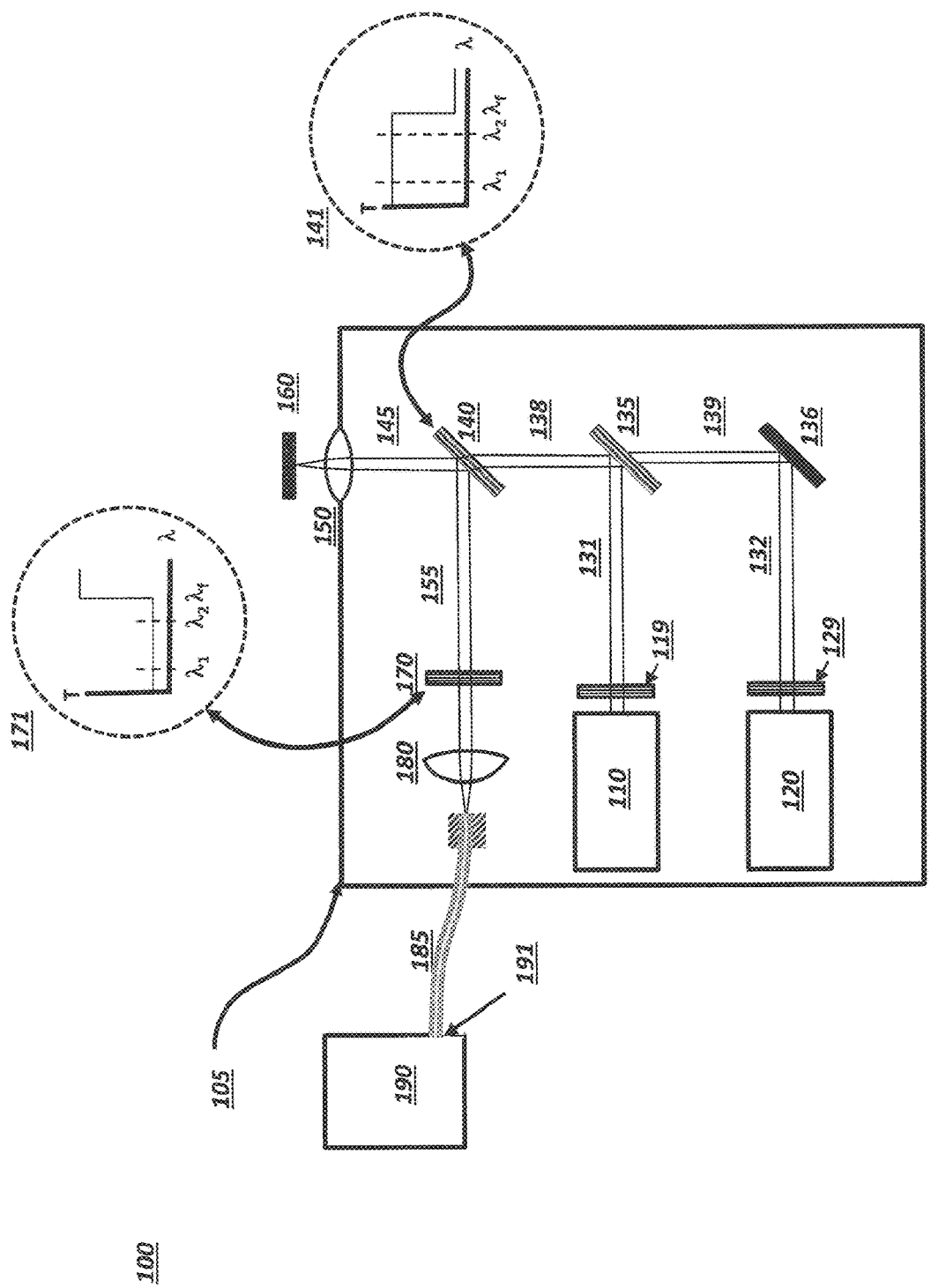
FIG. 1B – Prior Art

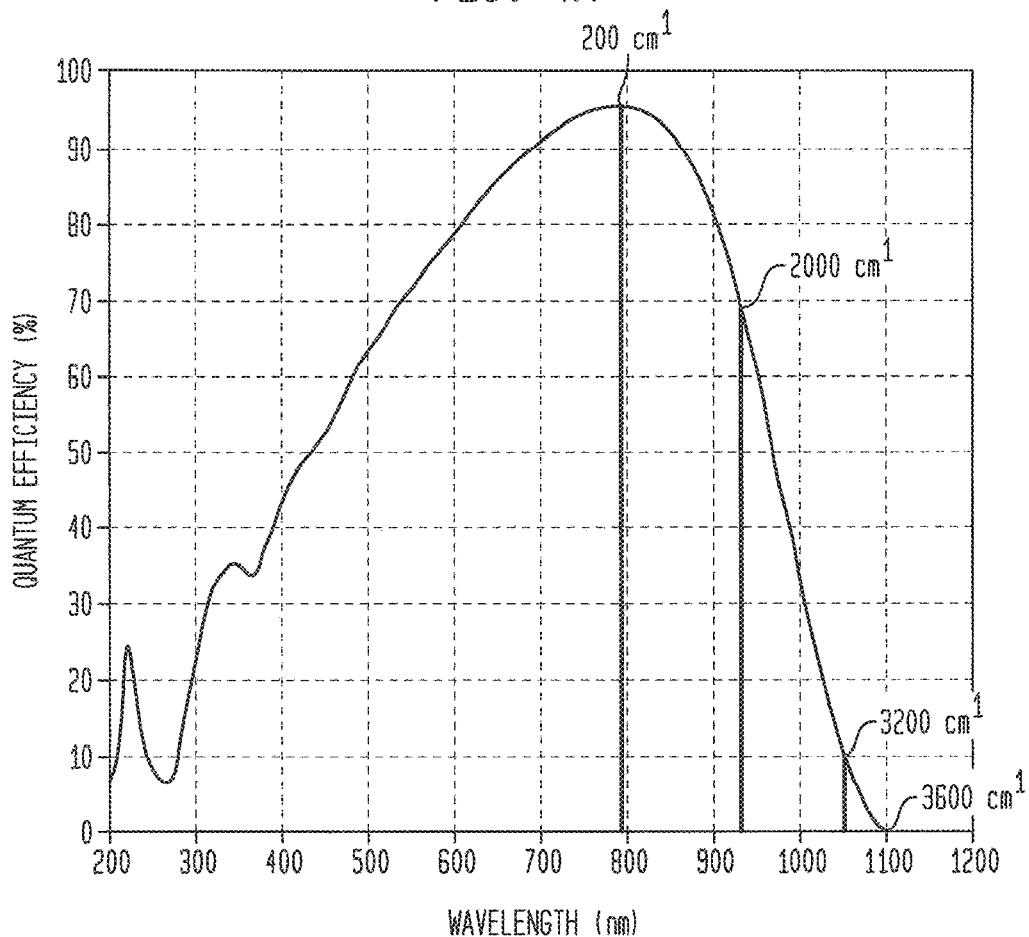

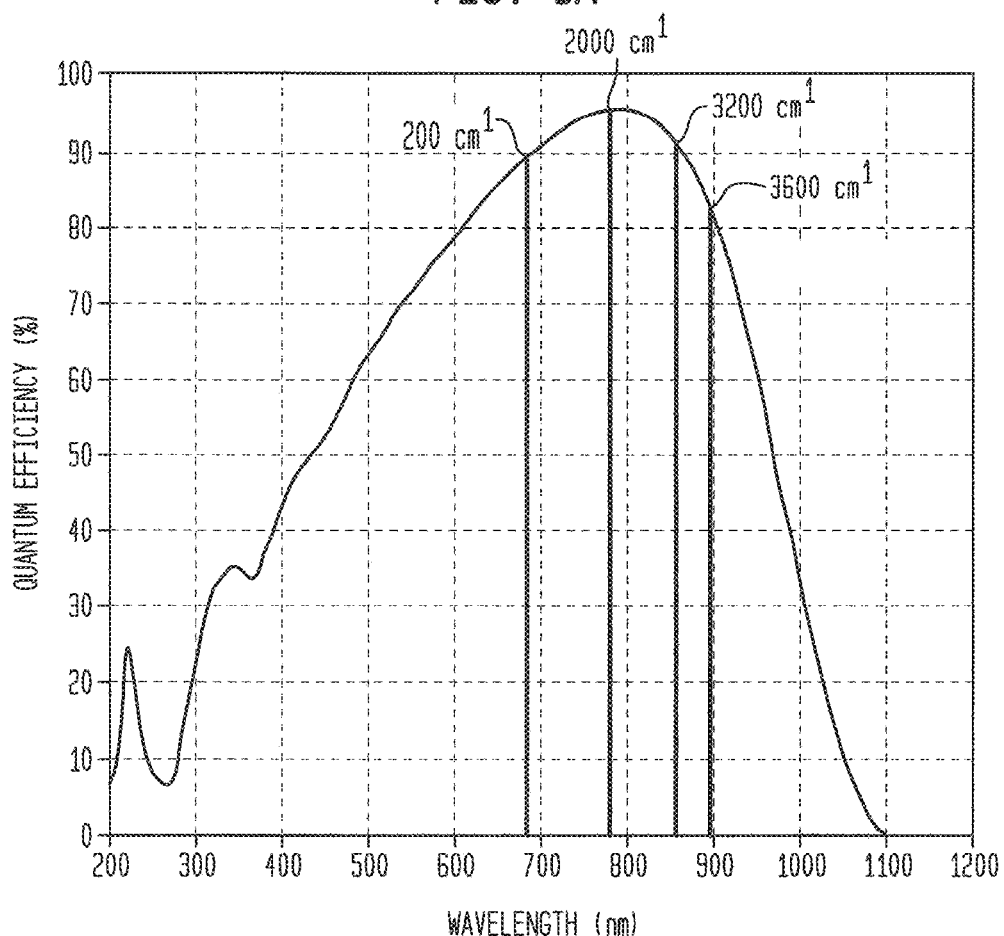

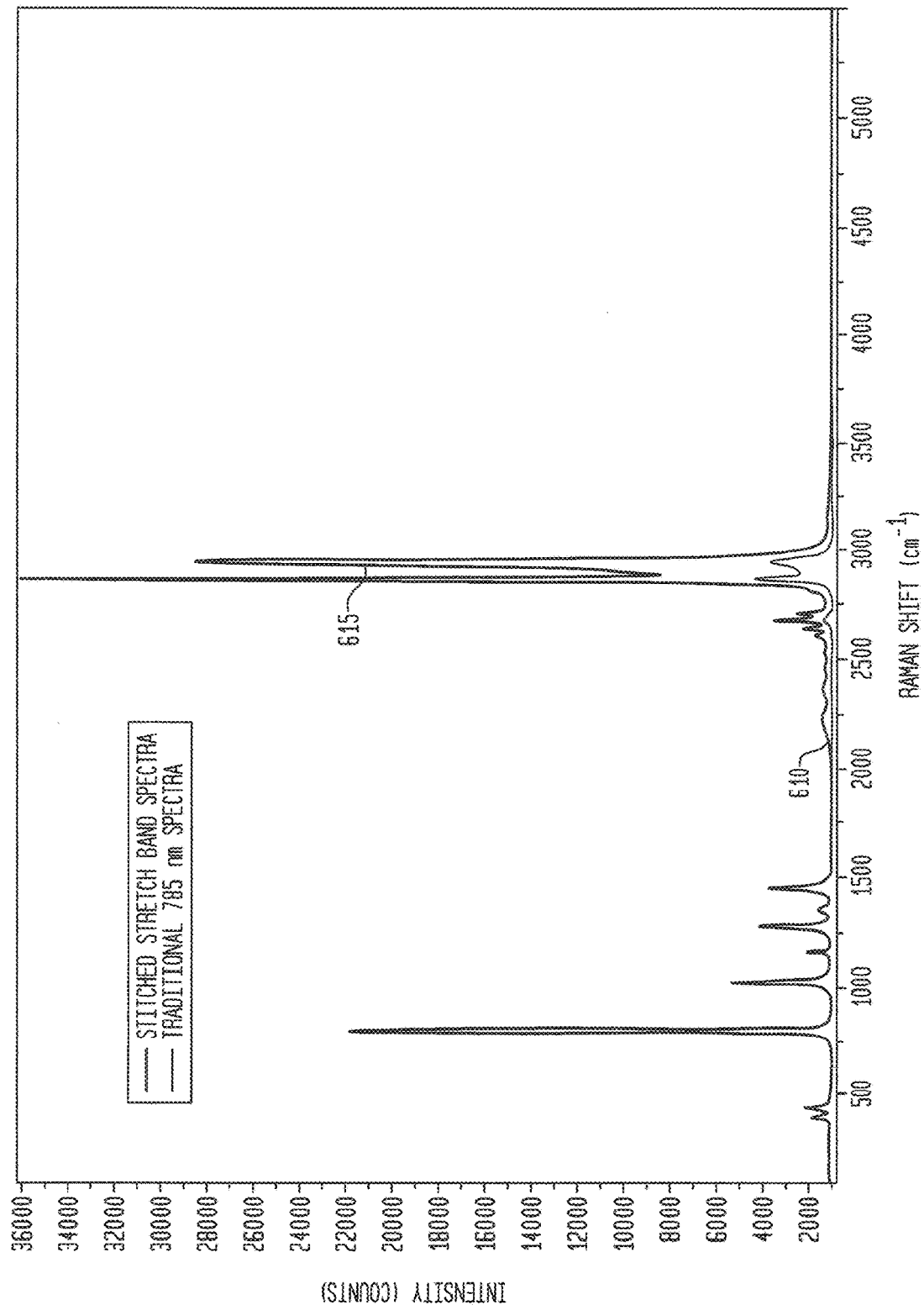

METHOD FOR SELECTION OF RAMAN EXCITATION WAVELENGTHS IN MULTI-SOURCE RAMAN PROBE

CLAIM OF PRIORITY

This application claims, as a Continuation in Part application, pursuant to 35 USC 120, priority to and the benefit of the earlier filing date of patent application Ser. No. 16/831,611, filed on Mar. 26, 2020, the contents of which are incorporated by reference, herein.

RELATED PATENTS

This invention disclosed, herein, is related to that subject matter recited and taught in U.S. Pat. No. 10,359,313, the contents of which are incorporated by reference, herein.

FIELD OF THE INVENTION

This invention relates to the field of spectroscopy and more particularly to a compact Raman spectroscopy system and method for providing enhanced quantitative analysis for process control.

BACKGROUND OF THE INVENTION

Raman spectroscopy is a well-known technique that can be used to observe vibrational, rotational and other low-frequency modes in molecules. Raman scattering is an inelastic process whereby monochromatic light typically provided by a laser interacts with molecular vibrations phonons or other excitations resulting in the energy of the laser photons being shifted up or down. Due to conservation of energy the emitted photon gains or loses energy equal to energy of the vibrational state.

Many Raman measurements suffer from fluorescence, which forces usage of longer wavelength (lower energy) excitation lasers to mitigate against the fluorescent signal overwhelming the Raman signal, thereby making the latter impossible to extract. Usage of longer excitation wavelengths facilitates extraction of Raman signals from fluorescent samples but at a cost of reduced sensitivity in the silicon CCD detectors that capture spectrometer signals.

Known Raman probes that capture a Raman spectra covering the entire range of wavenumbers from 0 $cm^{-1}$ to 4000 $cm^{-1}$ can be accomplished by use of:

(1) a single laser source with a large spectrometer incorporating long sensors to capture photons at all relevant wavenumbers with sufficient resolution;

(2) a single laser source with multiple spectrometers/detectors that each cover a different wavelength range (e.g. silicon and InGaAs);

(3) multiple laser sources with a single spectrometer, or (4) multiple laser sources with separate spectrometers configured to capture multiple Raman spectra each covering a smaller range of wavenumbers.

Examples of the use of multiple laser techniques are disclosed by:

"Novel Pressure-Induced Molecular Transformations Probed by In Situ Vibrational Spectroscopy", Yang Song, "Applications of Molecular Spectroscopy to Current Research in the Chemical and Biological Sciences", Mark T. Stauffer (ed.), Oct. 5, 2016. Chapter 8, "Spatially Compressed Dual-Wavelength Excitation Raman Spectrometer," J. B. Cooper, S. Marshall, R. Jones, M. Abdelkader, and K. L. Wise, Applied Optics, 53, 3333 (2014);

"Dual Wavelength Raman Spectroscopy: Improved Compactness and Spectral Resolution," J. Kiefer, https://www.americanpharmaceuticalreview.com/Featured-Articles/354604-Dual-Wavelength-Raman-Spectroscopy-Improved-Compactness-and-Spectral-Resolution/ posted 16 Oct. 2018.

"Raman Fusion Spectroscopy: Multiwavelength Excitation for Compact Devices, J. Kiefer, SciX 2019. (13-18 Oct. 2019).

"Apparatus and Method for Composite Raman Multispectral Spectrometry", BRUNEEL, Jean-Luc, BUFFETEAU, Thierry, DAUGEY, Nicolas, RODRIGUEZ, Vincent, WO2019220047 (2019) and U.S. Pat. No. 10,359,313, which is assigned to the Assignee of the Assignee of the instant application and whose contents are incorporated by reference, herein.

Each of the referred-to references focuses on capture of multiple Raman spectra using a dual-laser configuration. However, the references fail to disclose the means for selecting wavelengths used in the spectral analysis based on the material selected and the characteristics of the spectrometer utilized.

Hence, there is a need in the industry for a compact Raman probe and spectrometer system that provides for improved quantitative analysis using two or more probe laser wavelengths and a method for selecting the laser probe wavelengths to enhance a quantitative analysis of a target material under investigation for different applications.

SUMMARY OF THE INVENTION

The Raman spectral concatenation concept described herein allows use of a single, relatively compact spectrometer to collect both Fingerprint and Stretch Raman spectra (i.e., collected Raman wavelengths) and a method for selecting the laser source wavelengths to provide for enhanced quantitative analysis of target material under investigation. In accordance with the principles of the invention, the Fingerprint spectrum is captured using one excitation wavelength, whereas the Stretch spectrum is captured using a second wavelength selected based on a quantum efficiency of the spectrometer and the first wavelength. The selection of one or more of the laser source wavelengths in the manner disclosed, herein, provides for enhanced signal to noise ratio so as to enhance the performance of a quantitative analysis of a target material under investigation.

A compact dual-wavelength Raman probe configured to provide two or more separate laser wavelengths selected in a manner to provide enhanced quantitative analysis of material under investigation is disclosed Described herein are embodiments in which two laser sources may be integrated within the housing of (or internal to) a Raman probe or external to the housing of a Raman probe.

Described herein are embodiments in which light output emitted by two lasers sources may be combined in a common optical path, wherein the emitted light may be combined using either wavelength beam combining with dichroic mirrors or geometric beam combining.

Described herein are embodiments of a Raman Probe utilizing co-alignment of the excitation and collection light utilizing a same optical axis.

Described herein are embodiment of a Raman Probe utilizing a spatially offset of the excitation and collection lights utilizing separate optical paths Described herein are embodiments of a method for selecting the wavelengths of emitted by two laser sources in a Raman Probe wherein the wavelengths of the laser sources or probes are selected in a manner based, in part, on the quantum efficiency of a spectrometer used for the analysis of the light reflected by the target material.

In accordance with the principles of the invention, the wavelengths of the probe lasers used in a dual-wavelength Raman probe are selected based on the quantum efficiency of a spectrometer comprising a single detector array (silicon, InGaAs, or any other detector array) within the spectrometer. The quantum efficiency of a detector is a measure of the ratio of collected to incident photons versus wavelength and is a common characteristic of spectrometers supplied by manufacturers.

In accordance with the principles of the invention, the probe laser wavelengths may be determined for different applications based on the quantum efficiency of the spectrometer and the material in a target object such that a desired Raman spectra is substantially coincident to a peak of the detector quantum efficiency and, hence, achieving higher signal to noise ratio.

In accordance with the principles of the invention, the selection of Raman excitation wavelengths based on the quantum efficiency of the spectrometer allows shifting of both the Fingerprint and Stretch regions of the Raman spectrum to wavelengths at which silicon detectors (or similar detectors) have relatively high quantum efficiency.

In one aspect of the invention, Raman spectra of each of the two laser sources may be captured separately and subsequently concatenated, or stitched together, to provide a single spectral scan encompassing the entire range of data, including the Fingerprint and Stretch regions, wherein the signal-to-noise ratio of the Raman signal in the Stretch region is enhanced.

In accordance with one aspect of the invention analyzing each data set independently is also possible, while collecting the spectra from both excitation wavelengths simultaneously may also be possible.

The compact dual-wavelength Raman probe, disclosed herein, may include optics to configure the output beam of each laser source to have a circular, an elliptical or an elongated cross-section, approximating a shape of a circular or a shape of the elongated emission region of the laser near-field.

In one aspect of the invention, the light generated by the laser sources may be emitted toward a target object or material under investigation and the resultant scattered signal light is transmitted by the compact Raman probe via an optical beam that may also have a corresponding elliptical cross-section. The excitation and collection paths may be co-linear (i.e., co-aligned) or separate (e.g., spatially-offset (see USPPA 20080076985) or transmission geometry (see U.S. Pat. No. 8,085,396)). An optical fiber incorporating a core having dimensions approximating those of the returned scattered light beam, transmits the returned scattered light to the entrance aperture of a spectrometer.

In accordance with the principles of the invention of the dual-wavelength Raman probe disclosed herein, the dual-wavelength Raman probe may include external cavity lasers (ECLs) that may be integrated into the probe as wavelength-stabilized laser sources. See, for example, U.S. Pat. No. 9,059,555, "Wavelength-Stabilized Diode Laser," the contents of which are incorporated by reference herein. Or may retain the ECLs external to the Raman probe.

In accordance with the principles of the compact Raman probe disclosed herein, a distributed Bragg reflector (DBR) or distributed feedback (DFB) lasers may comprise a wavelength-stabilized laser source that may be integrally incorporated into the Raman probe or may be retained external to the Raman probe.

In accordance with the principles of the compact dual-wavelength Raman probe disclosed herein, the light emitted by a laser may be used as the pump source for a non-linear optical (NLO) conversion to produce a different wavelength, e.g., by second-harmonic generation (SHG), third-harmonic generation (THG), or any other non-linear optical process.

In accordance with the principles of the invention of a compact dual wavelength Raman probe, the selection of a second wavelength is based, in part, on a first wavelength and a spectral efficiency of the spectrometer used to collect the Raman signal.

BRIEF DESCRIPTION OF DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings making apparent to those skilled in the art how the several forms of the invention may be embodied in practice. In the accompanying drawings:

FIG. 1A illustrates a block diagram of an exemplary embodiment of a dual-wavelength co-aligned/reflective Raman probe using external laser sources.

FIG. 1B. illustrates a block diagram of an exemplary embodiment of a dual-wavelength co-aligned/reflective Raman probe using internal laser sources.

FIGS. 4A and 4B illustrate an exemplary quantum efficiency response of a silicon detector linear array with 300 nm dispersion for two different Raman laser pump sources.

FIGS. 5A and 5B illustrate a second exemplary quantum efficiency response of a silicon detector linear array with 300 nm dispersion for two different Raman laser pump sources in accordance with the principles of the invention.

FIG. 6A illustrates an exemplary spectral analysis of a target material containing cyclohexane, with and without the selection of excitation wavelengths in accordance with the principles of the invention.

DETAILED DESCRIPTION

Figure 1C:
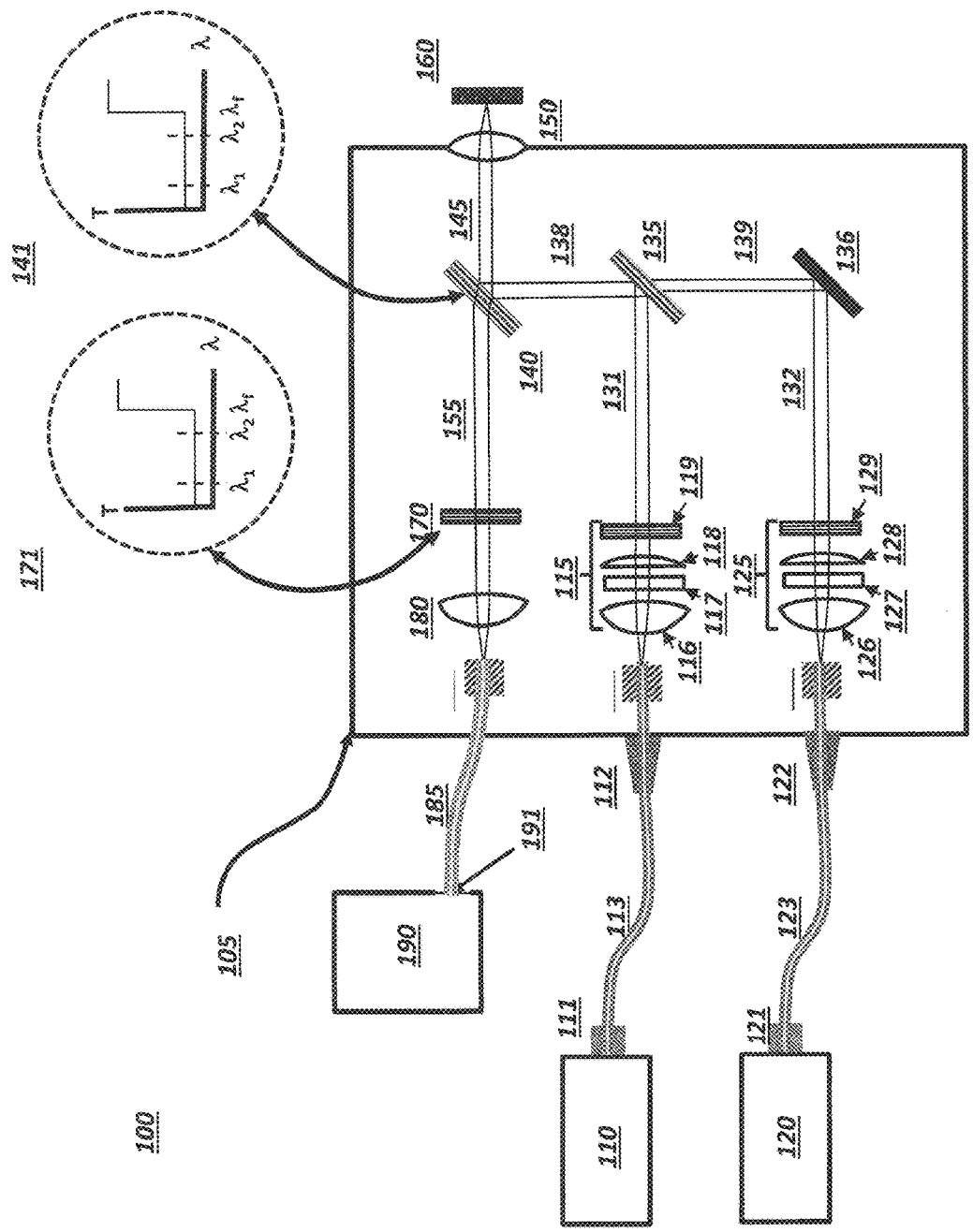
FIG. 1C illustrates a block diagram of an exemplary embodiment of a dual-wavelength co-aligned/transmissive Raman probe using external laser sources.

FIG. 1A illustrates a block diagram of an exemplary embodiment of a compact dual-wavelength co-aligned/reflective Raman probe configuration where the light outputted by corresponding ones of the illustrated two laser sources are combined along a same optical path using wavelength beam combining with a dichroic mirror, which is similar to the configuration shown in, and disclosed with regard to FIG. 5 of U.S. Pat. No. 10,359,313, which discloses the use of diode lasers as the light sources in Raman spectroscopy.

In this exemplary embodiment, a dual wavelength Raman probe 100 includes a housing 105 and two external light sources 110 and 120, (hereinafter referred to as lasers or laser sources. However, it would be recognized that the light sources 110 and 120 may similarly be non-lasing sources, e.g., a super luminescent diode) coupled via optical fibers 113 and 123, respectively, to the internal optics within housing 100. The lasers 110 and 120 may emit light in a single spatial mode or in multiple spatial modes. Optical couples 111, 112, 121, and 122 are known devices for coupling optical fibers to equipment or devices.

The laser sources 110 and 120 may be any laser device or system; preferably laser sources 110 and 120 are wavelength-stabilized laser sources having narrow bandwidth. One class of lasers that may be used as a wavelength-stabilized laser source is an external cavity laser. See, for example, U.S. Pat. Nos. 9,059,555 and 9,577,409, which are assigned to the assignee of the instant application and whose contents are incorporated, in their entirety, by reference, herein, and describe exemplary external wavelength stabilized diode lasers.

Sources 110, 120 may also be semiconductor lasers that incorporate gratings within their structure, such as a distributed feedback (DFB) or distributed Bragg reflector (DBR) laser.

Laser sources 110, 120 may also be a DFB or DBR laser coupled to a non-linear optical element for second- or third-harmonic generation of shorter wavelength laser light, as is well-known in the art.

The compact dual-wavelength Raman probe 100 further includes optics 115, 125 to configure the output beam of the laser sources 110, 120. Exemplary components shown in FIG. 1A, are lenses 116, 117, and 118 (optics 115) to reshape the optical beam associated with laser 110, to form, for example, a beam cross-section suitable for exciting Raman signal (or wavelengths) by a target of interest, 160, and corresponding components 126, 127, and 128 (optics 116) to reshape the optical beam associated with laser 120. Narrowband filters 119 and 129 reject spontaneous emission from the outputs of lasers 110 and 120.

Collimated light beams 131 and 132 are combined into a single collimated beam 138 by use of a first dichroic mirror 135 and reflecting mirror 136, wherein mirror 136 redirects light beam 132 towards first dichroic mirror 135. First dichroic mirror 135 further passes light beam 132 and redirects light beam 131 to form collimated beam 138.

In one aspect of the invention, a single short pass filter (not shown). with cut-off wavelength designed to pass the wavelengths emitted by the first laser 110 and the second laser 120 but blocks wavelengths beyond the longer of the two wavelengths (i.e., light beams 131, 132) may be placed after the light beams 131, 132 are combined into collimated beam of light 138.

The probe (excitation, illumination) light beam 138 is transmitted through a second short-pass dichroic mirror 140, with transmission characteristics schematically depicted in inset 141, to lens 150 which focuses the combined light, comprising the wavelengths emitted by the first laser 110 and the second laser 120, onto the target object 160 along light path 145

Light scattered from the target object 160 will include Raman, Rayleigh and fluorescent components, which may be collected by lens 150 and directed back towards the second dichroic mirror 140 through light path 145. In this illustrated case, dichroic mirror 140 is configured to reflect the longer Stokes-shifted Raman photons into collimated beam 155. Light at wavelengths longer than the filter cutoff, including at the two excitation wavelengths, will, to a great extent, pass through second dichroic mirror 140 and be largely eliminated from beam 155.

In one aspect of the invention, additional optical elements (not shown) may be included in the light path of light beam 138 to shape light beam 138. For example, light beam 138 may be shaped into a circular beam such that the light beam 138 (i.e., combined first excitation wavelength and second excitation wavelength) forms an annular region on said target object 160. In one aspect of the addition, the optical elements may be configured to adjust a diameter of the annular region projected onto the target object. In accordance with another aspect of the invention, the additional optical elements (not shown) may be included the light path of light beam 138 to shape light beam 138 into an elliptical or elongated shape.

The spatial extent of the excitation light on the target 160 may be sufficiently long to give rise to off-axis scattered light, which may result in the reflection of a range of wavelengths—including those that would be preferentially excluded—by the second dichroic mirror 140 into beam 155. The design of dichroic mirror 140 preferably is such that unwanted light is eliminated as much as is possible.

Dichroic mirror 140 may be an edge filter that is designed to direct wavelengths of the Raman scattered light toward spectrometer 190, along a single optical fiber or axis (i.e., co-aligned), while substantially removing other light near the pump wavelengths.

In an embodiment of the invention disclosed in which the Stokes signal wavelength is to be detected, the dichroic mirror 140 is a short-pass filter that reflects wavelengths longer than that of the pump wavelength and substantially removes wavelengths at and shorter than the pump wavelengths from optical beam 155, as shown.

In an embodiment of the invention disclosed, in which anti-Stokes signals are to be detected, the dichroic mirror 140 is a long-pass filter that reflects wavelengths shorter than that of the pump wavelength and substantially removes wavelengths at and longer than the pump wavelengths from optical beam 155.

Dichroic mirror 140 is typically used at a 45° angle of incidence and, in the embodiment shown in FIG. 1A, transmits light from the laser sources 110 and 120 towards the target 160 under investigation. Exemplary dichroic mirror are Semrock's RAZOREDGE beamsplitters. RAZOREDGE is a registered Trademark of IDEX Health & Science LLC, Rohnert Park, Calif.

For detection of Stokes signals, long-pass dichroic filter 170 is designed to transmit wavelengths longer than its cutoff wavelength, as shown in inset 171. Lens 180 focuses the filtered light onto the entrance facet of optical fiber 185, which transmits the light to slit 191 of a compact spectrometer 190.

The filter 170 may be one of: a dichroic filter, a volume holographic grating filter, and a fiber Bragg grating filter, used in combination with focusing and collection optics or any filter that provides the required wavelength-dependent blocking and transmitting capabilities. Exemplary filters include STOPLINE® single notch filters and RAZOREDGE® ultra-steep long-pass edge filters for Stokes detection and ultra-steep short-pass edge filter for anti-Stokes detection. STOPLINE and RAZOREDGE are registered Trademarks of IDEX Health & Science LLC, Rohnert Park, Calif.

Spectrometer 190 is designed to diffract light input through slit 191 to a linear silicon detector array (not shown). The range of light diffracted onto the array is limited by the design of the spectrometer's diffraction grating and linear extent of the detector array as is well-known in the art. Accordingly, a spectrometer's grating and detector may be configured so that the detector receives a limited range of wavelengths, e.g., approximately 791 nm to 934 nm for Stokes signals. An exemplary 2048-element linear detector may have a resolution of approximately 1 $cm^{-1}$ (i.e., 1 wavenumber, wherein wavenumber is a term of art within the optical field) in both the Fingerprint and Stretch regions of the spectrum if detected separately.

In another embodiment of the invention, the light from lasers 110 and 120 of FIG. 1A may be combined onto a single fiber (not shown) before being presented to dichroic mirror 140. The elements generating and combining the light from lasers 110 and 120 need not be contained within the body 105 and instead may be combined outside of the body 105 by means of either geometric or dichroic combination and subsequently combined into a single fiber before being presented to the dichroic mirror 140.

FIG. 1B illustrates an exemplary embodiment of a dual-laser co-aligned/reflective Raman probe wherein the laser sources 110, 120 are incorporated within the Raman probe housing 105. In this second exemplary embodiment of a dual-laser Raman probe, the elements (components) and operation of the Raman probe shown in FIG. 1B are similar to the elements and operation discussed with regard to the dual-wavelength Raman probe shown in FIG. 1A. As both the components and the operation of the configuration shown in FIG. 1B are similar to the components and operation of the dual-laser Raman probe shown in FIG. 1A, the details of the components and operation of the configuration shown in FIG. 1B would be understood by those skilled in the art from a reading of the components and operation of FIG. 1A and, thus, further discussion of FIG. 1B is believed not needed.

FIG. 1C illustrates an exemplary embodiment of a dual-laser co-aligned Raman/transmissive probe with a Raman Probe wherein where the light outputted by external lasers sources 110, 120, are combined into a single optical beam 138 using wavelength beam combining with a dichroic mirror 135 and reflective mirror 136, as previously discussed. In this third exemplary embodiment, the second dichroic filter, 140, functions to direct the excitation light of the laser sources on to target object 160 through lens 150. Lens 150 further collects, and transmits to dichroic filter 140, the Raman wavelengths generated in response to an interaction of the excitation wavelengths. Dichroic filter 140 then transmits the collected Raman light, as optical beam 155, to filter 170. In this case, filter 170, operates to remove the light of laser sources 110 and 120 from being presented to slit 191 of spectrometer 190.

In this third exemplary embodiment of a dual-laser Raman probe, the remaining elements (components) and operation shown in FIG. 1C are similar to the elements and operation discussed with regard to the dual-wavelength Raman probe shown in FIG. 1A. As both the components and the operation of the configuration shown in FIG. 1C are similar to the components and operation of the dual-laser Raman probe shown in FIG. 1A, the details of the components and operation of the configuration shown in FIG. 1C would be understood by those skilled in the art from a reading of the components and operation of FIG. 1A and, thus, further discussion of FIG. 1C is believed not needed.

Figure 1D:
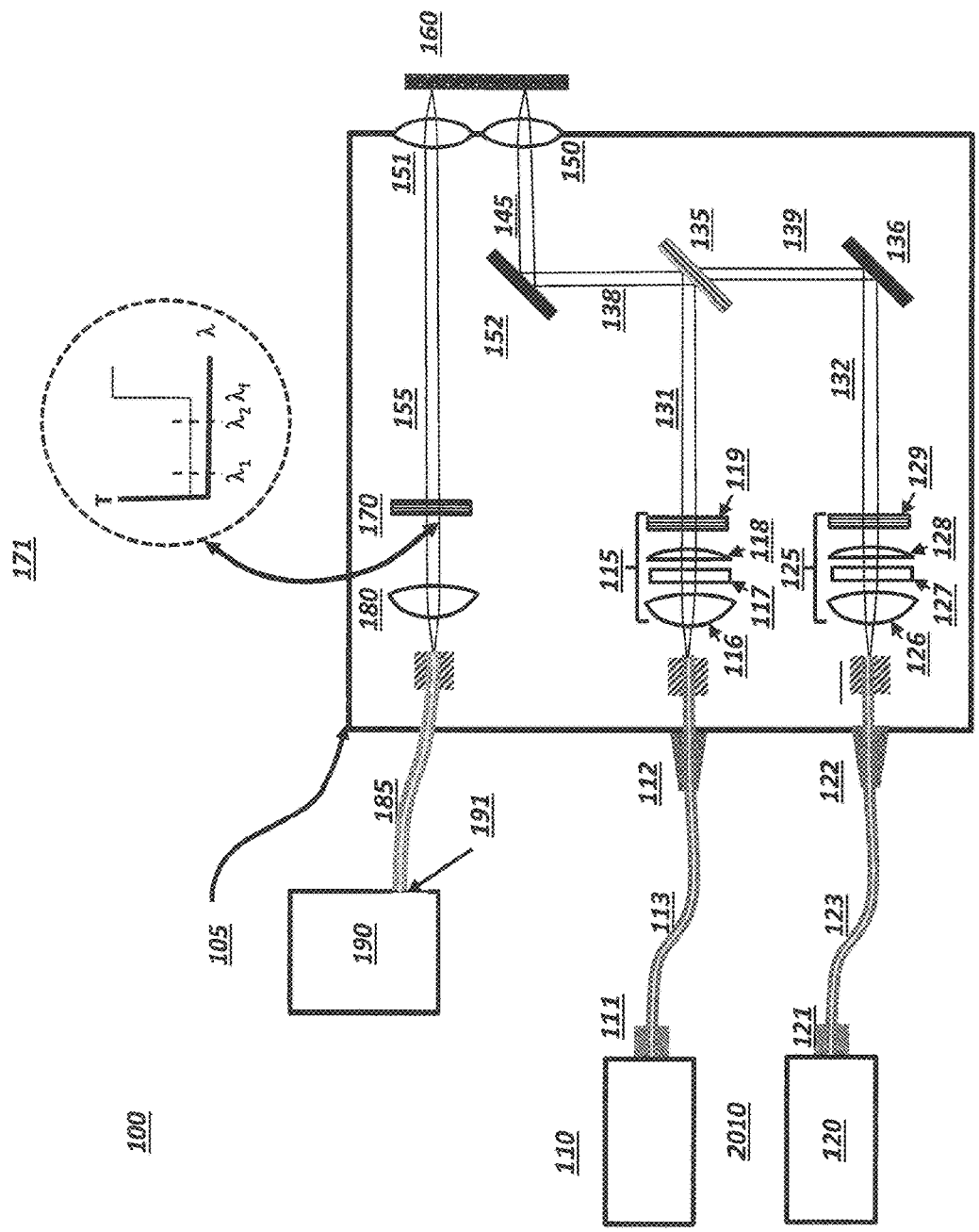
FIG. 1D illustrates a block diagram of an exemplary embodiment of a dual-wavelength spatially-offset/transmissive Raman probe.

FIG. 1D illustrates an exemplary embodiment of a dual-laser spatially-offset/transmissive Raman probe where the light outputted by two external laser sources 110, 120 is combined along a same optical path using wavelength beam combining with a dichroic mirror 135 and mirror 136 as previously discussed. The combined light 138 is then directed by mirror 152 through focusing lens 150 onto target object 160.

Collection lens 151 collects the Raman light generated in response to the illumination of the target object 160 with the combined excitation (or illumination light) light 138 and directs the collected Raman light, i.e., light beam 155, to filter 170, which operates to remove the excitation wavelengths from the collected Raman light, as previously discussed.

In this fourth exemplary embodiment of a dual-laser Raman probe, the remaining elements (components) and operation shown in FIG. 1D are similar to the elements (components) and operation discussed with regard to the dual-wavelength Raman probe shown in FIG. 1A. As both the remaining components and the operation of the configuration shown in FIG. 1D are similar to the remaining components and operation of the dual-laser Raman probe shown in FIG. 1A, the details of the remaining components and operation of the configuration shown in FIG. 1D would be understood by those skilled in the art from a reading of the components and operation of FIG. 1A and, thus, further discussion of FIG. 1D is believed not needed.

Figure 7:
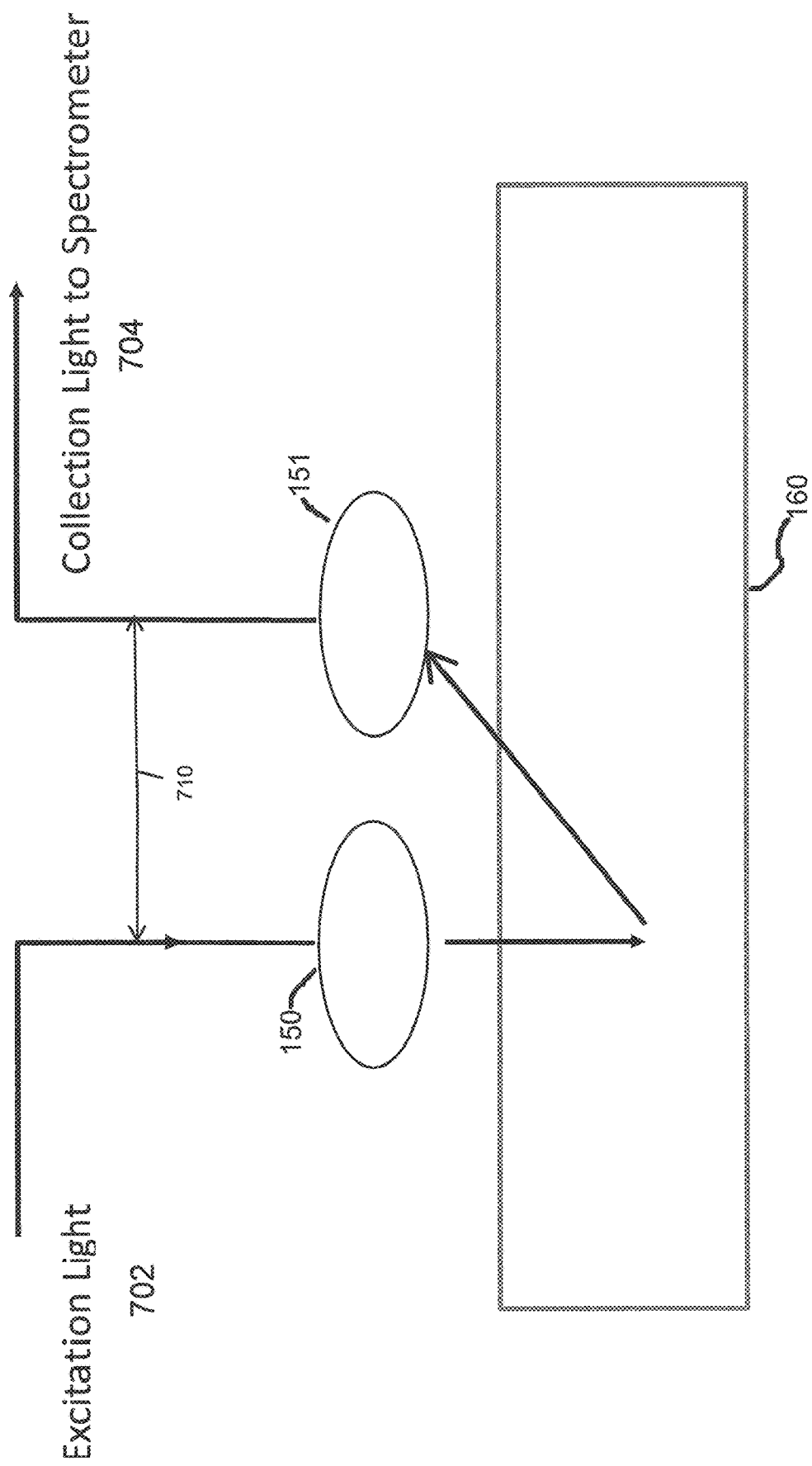
FIG. 7 illustrates a block diagram of an exemplary embodiment of a distance based spatial-offset Raman Probe configuration.

FIG. 7 illustrates a block diagram of an exemplary embodiment of a distance based spatial-offset Raman probe configuration, wherein the spatial separation (or distance) 710 between the excitation light wavelengths 702 and the collected light wavelengths 704 allows for the detection of sub-surface regions of target object 160. Hereafter, the combined light 138 comprising first excitation wavelength 210 and second excitation wavelength 220 shall be referred to as excitation light 702 and the Raman light wavelengths shall be referred to as collected light wavelengths 704

By increasing a distance 710 between the excitation light wavelengths 702 and collected light wavelengths 704 regions below a surface of target object 160 may be observed.

Figure 8:
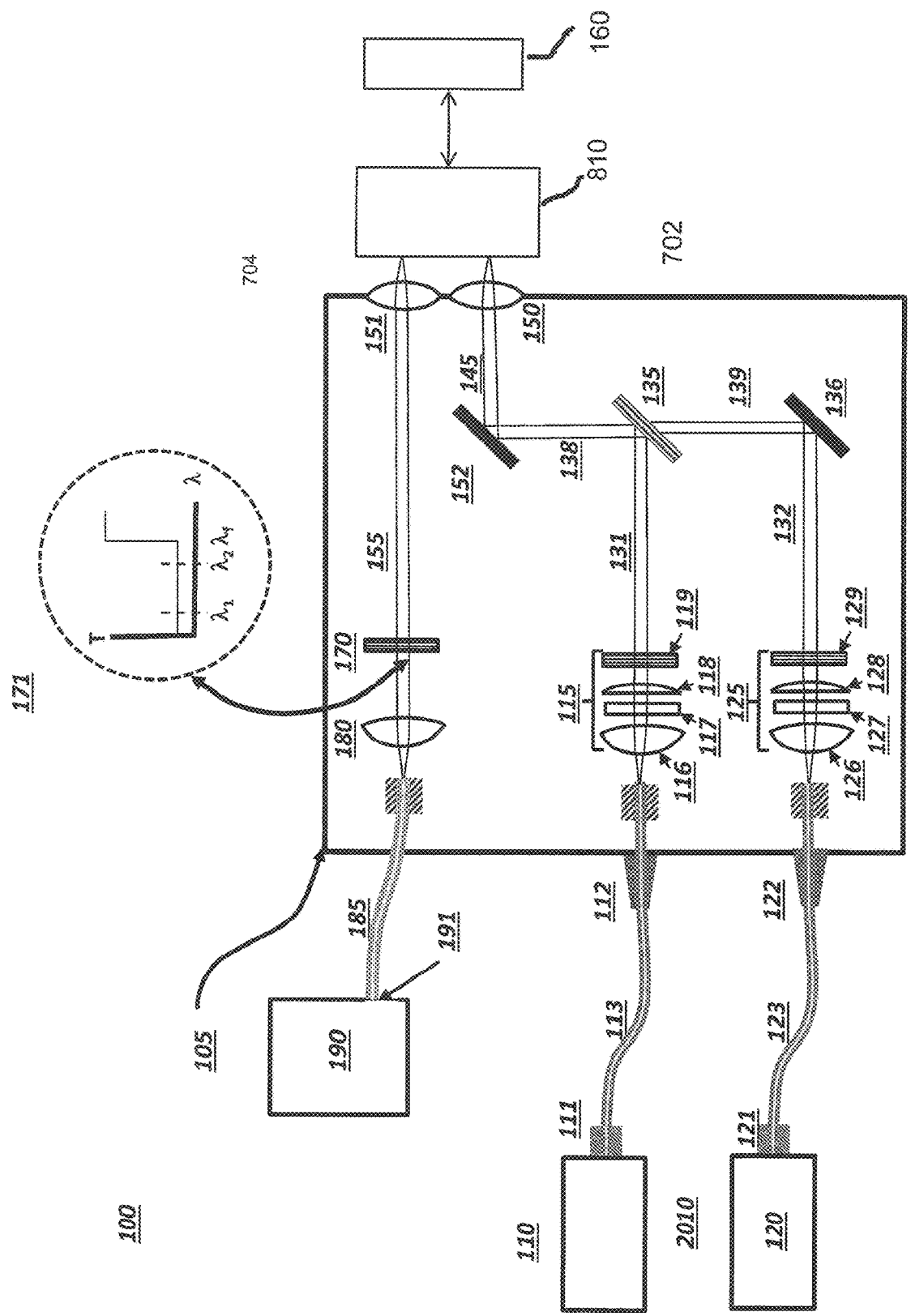
FIG. 8 illustrates a block diagram of another embodiment of a spatially offset Raman probe.

FIG. 8 illustrates a block diagram of a second embodiment of a distance based spatially oriented Raman probe in accordance with the principles of the invention. In this illustrated embodiment, which is similar to the embodiment shown in FIG. 1D, further includes optical device 810, which is in optical communication with lenses 150 and 151. In this second embodiment, light (or excitation wavelengths) emitted by lens 150 are directed to optical device 810 through an optically clear material (e.g. optical fibers) and Raman light 704, generated in response to excitation light 702 illuminating target object 160, may be collected by optical device 810 and provided to collection lens 151 through a second set of optically clear material (e.g., optical fibers).

For example, optical device 810 may comprise an optical probe that may be used to scan target object 160 while emitting excitation wavelengths 702 and collecting Raman wavelengths 704. The tip of optical probe may include an optically clear material (e.g., plurality of optical fibers) that receive excitation wavelengths from lens 150 and a second, separate, optically clear material (e.g., optical fibers) that collect Raman light wavelengths and provide the collected Raman wavelengths to collection lens 151. Alternatively, optical device 810 may be a stationary device that includes a platform on to which target object may be placed or contained. In one aspect of the invention, optical device 810 may include a plurality of optical fibers, for example, that receive excitation wavelengths 702 and a second plurality of optical fibers, for example, that collect Raman light wavelengths 704 and provide the collected Raman light wavelengths to collection lens 151. In addition, the first set of optical fibers and the second set of optical fibers may be orientated as shown in FIG. 7, for example. In another aspect, the first set of optical fibers may be oriented such that the excitation wavelength 702 is projected onto target object 160 at an angle and the second set of optical fibers may be oriented at an angle with respect to target object 160. In still another aspect of the invention, the first set of optical fibers (or clear material) may be positioned on one side of target object 160 and the second set of optical fibers may be positioned on a second side of target object 160.

Although optical device 810 is shown external to housing 110, it would be recognized that optical device 810 may be internal to housing 110.

Figure 9B:
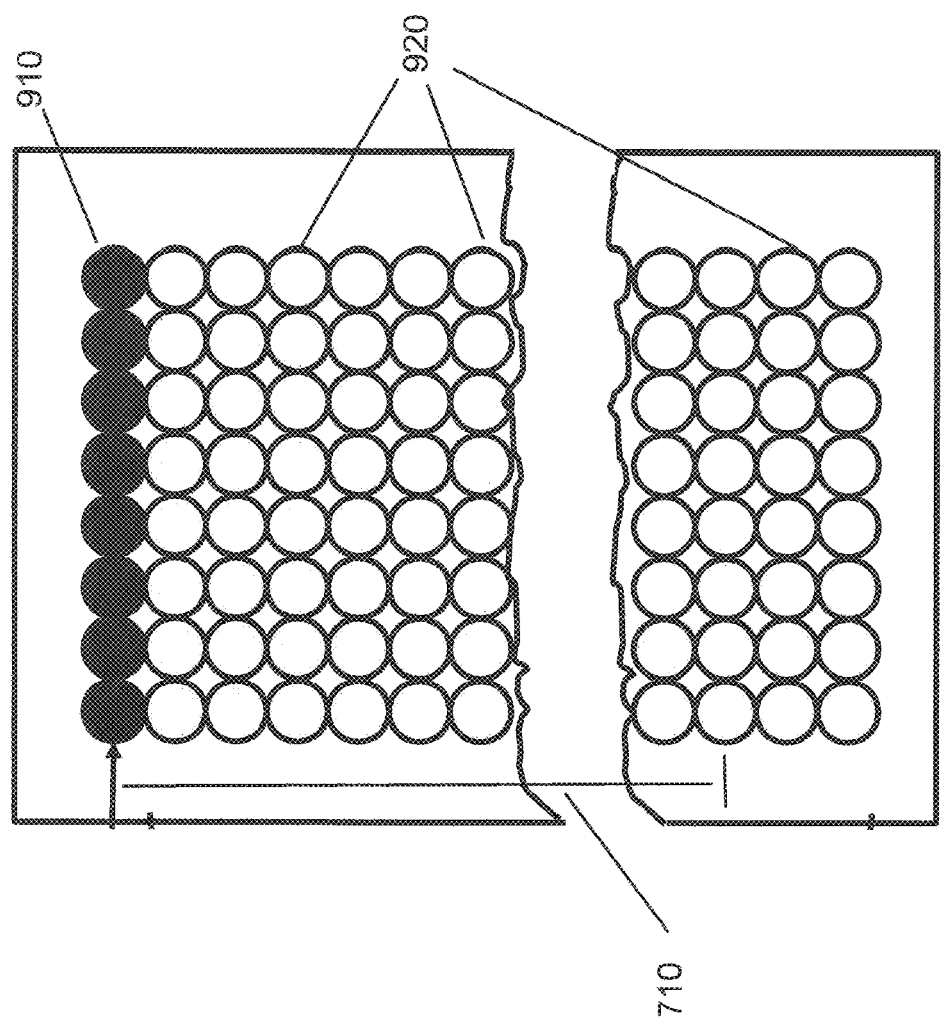
FIGS. 9A and 9B illustrate exemplary 1-dimensional and 2-dimensional linear arrays for the transmission of excitation wavelengths and collection of Raman wavelengths
Figure 9A:
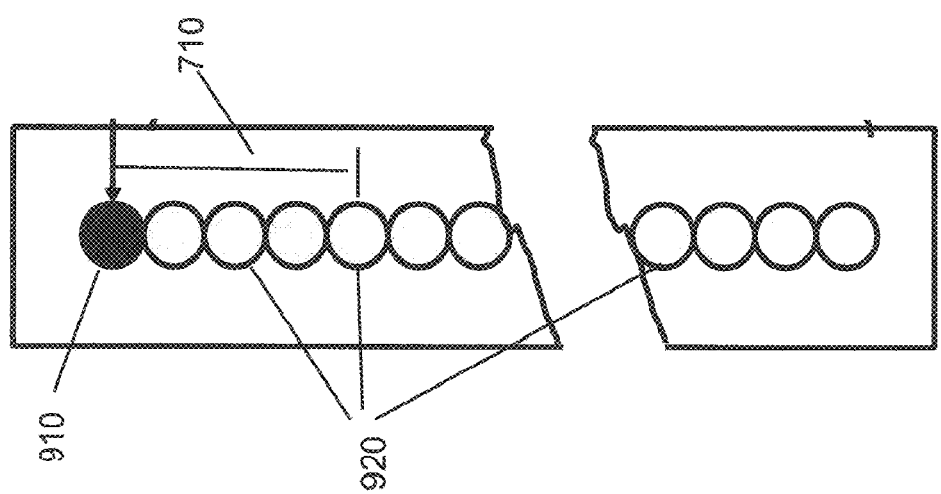

FIG. 9A illustrates a first exemplary embodiment of optical device 810 wherein a first set of a plurality of optical fibers (or other optically clear material) 910, and a second set of optical fibers 920 are arranged in a 1-dimensional array. In this exemplary embodiment, optic fibers 910 represent a transmissive device that may be used to provide excitation wavelengths or light 702 to target object 160 while optical fiber 920 represent a receptive device that may be used to collect Raman light or wavelengths 704 and provide the collected light to collection lens 151 (see FIG. 8).

Spatial distance 710 between the excitation wavelengths 702 and the Raman wavelength 704 may be varied, for example, by utilizing different ones of collection fibers 920.

FIG. 9B illustrates a second example of optical device 810, which includes a two-dimensional array comprising a first and second sets of optical fibers 910, 920 are arranged in a matrix.

As with the arrangement shown in FIG. 9A, excitation wavelengths or light 702 may be provided to target object 160 through fibers 910, while Raman light 704 may be collected through optical fibers 920.

In this illustrated embodiment, spatial distance 710 may be measured horizontally, vertically or diagonally with respect to the transmissive fibers and the receptive fibers.

In aspect of the invention, a mask may be utilized to limit the number of receptive devices receiving the Raman light wavelengths. The mask may be used for determining a minimum separation (or maximum separation distance). Returning to FIG. 9A, a mask (not shown) may be positioned between the second and fifth rows of receptive fiber optic cables, 920 to establish a minimum separation distance between the transmissive fiber optic cable 910 and the receiving fiber optic cables 920. Accordingly, the separation distance may be made variable.

FIGS. 10A-10F illustrate exemplary embodiment of optical device 810, wherein optical fibers 910, 920 are arranged in a circular or annular configuration.

Figure 10C:
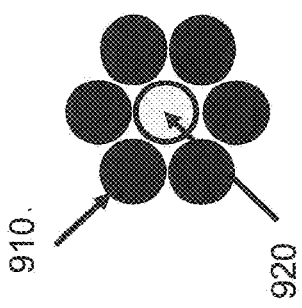
FIGS. 10A-10F illustrate exemplary circular or annular configurations for the transmission of excitation wavelengths and collection of Raman wavelengths. It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such elements is not provided herein. The disclosure herein is directed to also variations and modifications known to those skilled in the art.
Figure 10F:
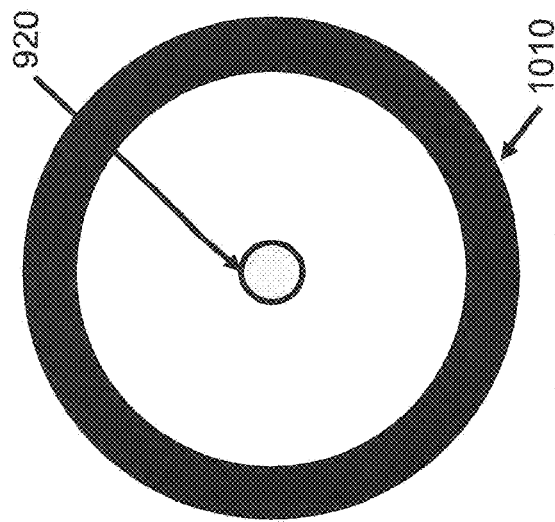
Figure 10B:
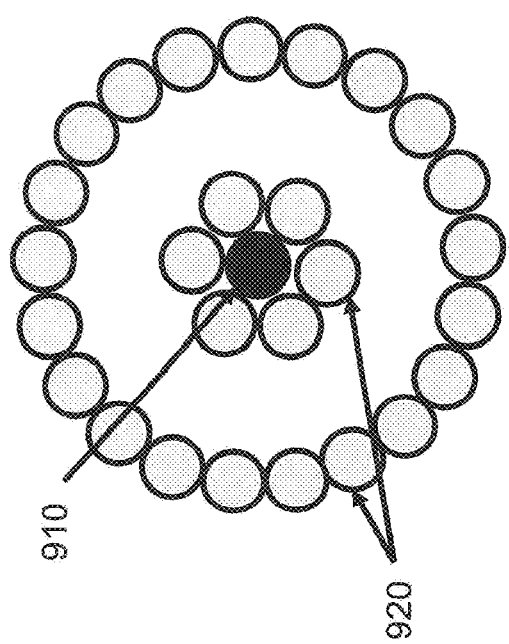
Figure 10E:
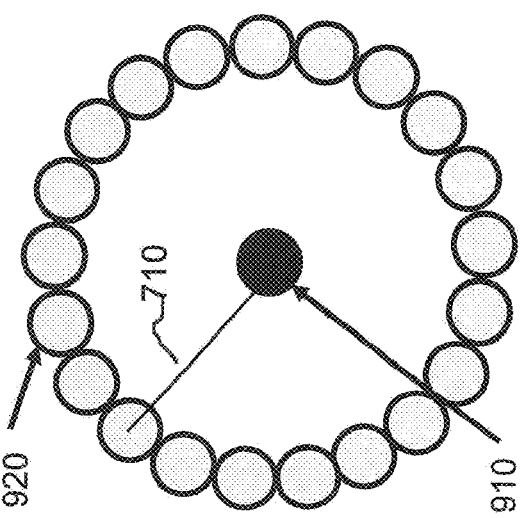
Figure 10A:
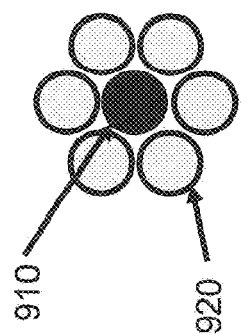

FIG. 10A illustrates an example of a center transmissive fiber 910 surrounded by a plurality of collection fibers 920.

FIG. 10B illustrates an example of a center transmissive fiber 910 surrounded by two rows of a plurality of collection fibers 920.

FIG. 10C illustrates an example of a plurality of transmissive fibers 910 centered around a center collection fiber 920.

Figure 10D:
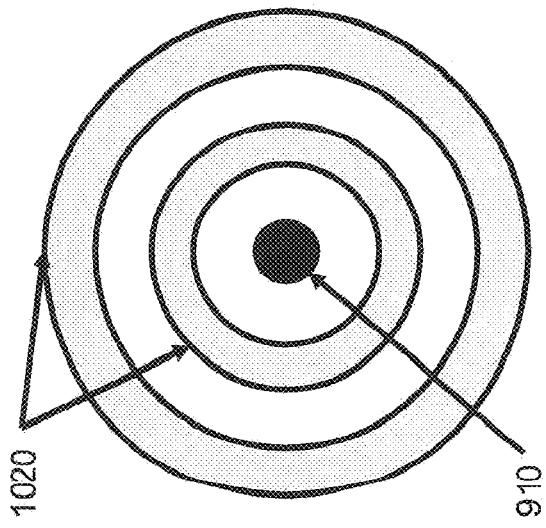

FIG. 10D illustrates an example of a center based transmissive fiber 910 surrounded by a ring of optically clear material 1020 for collecting the Raman light 704.

FIG. 10E illustrates an example of a center based transmissive fiber 910 surrounded by a plurality of collection fibers 920.

FIG. 10F illustrates an example of a center-based collection fiber 920 surrounded by a optically clear material 1010.

In one aspect of the invention, physical separation 710 of excitation wavelength 702 from collected wavelength 704 may be achieved through the use of a central illumination (excitation) region and an annular collection region. In another aspect of the invention, physical separation 710 of excitation wavelength 702 from collected wavelength 704 may be achieved through the use an annular illumination (excitation) region and a central collection region. In another aspect, the collection wavelength region may be physically moved or masked from the excitation wavelength region to allow for variable distance between the excitation wavelength illumination area and the collection light wavelength area.

In another aspect of the invention. the excitation wavelength region and the collection wavelength region may be oriented on opposite sides of the target object, 160, in a so-called transmission configuration.

In still another embodiment of the invention, the excitation wavelengths 702 may be directed toward target object 160 at an angle. Similarly, the collected wavelengths 704 may be collected at an angle with respect to the target object 160.

Although exemplary embodiments of a dual wavelength co-aligned/reflective Raman Probe, with external lasers (FIG. 1A), a dual wavelength co-aligned/reflective n Raman Probe, with internal lasers (FIG. 1B), a dual wavelength co-aligned/transmissive Raman Probe with external lasers (FIG. 1C) and a dual wavelength spatially-oriented/reflection Raman Probe with external lasers (FIG. 1D) are discussed, it would be understood that the method of selection of excitation wavelength presented, herein, is applicable to other types of dual wavelength Raman Probes (e.g., spatially-oriented/reflection Raman Probe with external lasers or internal lasers) and considered to be within the scope of the invention claimed.

In addition, it would be known by those skilled in the art that the combining of the excitation wavelengths discussed may be performed by any of a known number of known wavelength combining methods (e.g., wavelength beam combining with dichroic mirrors or geometric beam combining, see U.S. Pat. No. 7,420,996).

In accordance with the principles of the invention, the excitation lasers 110, 120 disclosed, herein, may be operated simultaneously, concurrently or sequentially. Sequential operation eliminates spurious signals e.g., fluorescence, that may be generated when both laser sources were to be operated simultaneously. However, it would be understood that simultaneous or concurrent operation has been considered and both concurrent and sequential operation of the laser sources is considered within the scope of the invention. Hence, when the operation of the sources is concurrent, the laser light of the two sources may be combined as in joining together to form a single light beam composed of two wavelengths (e.g., wavelength beam, geometric beam combining (see U.S. Pat. No. 7,420,996, for example).

In the case of where the operation of the sources is sequential, then the laser light of one source is considered "combined" with the non-presence of light from the second laser light source such that a single beam of a single wavelength is formed.

Exemplary Raman pump wavelengths currently in use are 532 nm, 638 nm, 785 nm, 830 nm, and 1064 nm. As is known in the art, shorter wavelength pump wavelengths yield higher Raman scattered signals as the Raman intensity is proportional to $\lambda^{-4}$. However shorter pump wavelengths are more likely to give rise to fluorescence, which can overwhelm the Raman spectral features. The method of Raman concatenation offers the possibility of mitigating the negative impact of fluorescence with the shorter wavelength excitation source since fluorescence is wavelength dependent while the Raman signal is both proportional to the $\lambda^{-4}$ and shifts with respect to the excitation wavelength. This allows for the possibility of quantifying a Raman signal in the Stretch band when it is not possible to quantify a Raman signal in the Fingerprint region when high levels of fluorescence are present. Finally, the specific wavelength of the short or long wavelength laser source can be selected to mitigate any fluorescence resonance effects.

Further, Stokes spectra are typically more intense than are anti-Stokes spectra. As is well known in the art, a Stokes shift of v (measured in wavenumbers, i.e., cm$^{-1}$) will give rise to a Raman signal wavelength, $\lambda_s$, related to the probe wavelength, $\lambda_p$, by:

$$1/\lambda_s = 1/\lambda_p + v \quad (1)$$

Generally, the "Fingerprint" region of the spectrum includes wavenumbers less than about 2000 cm$^{-1}$ whereas the "Stretch" region includes wavenumbers ranging from about 2000 cm$^{-1}$ to 4000 cm$^{-1}$.

Figure 2:
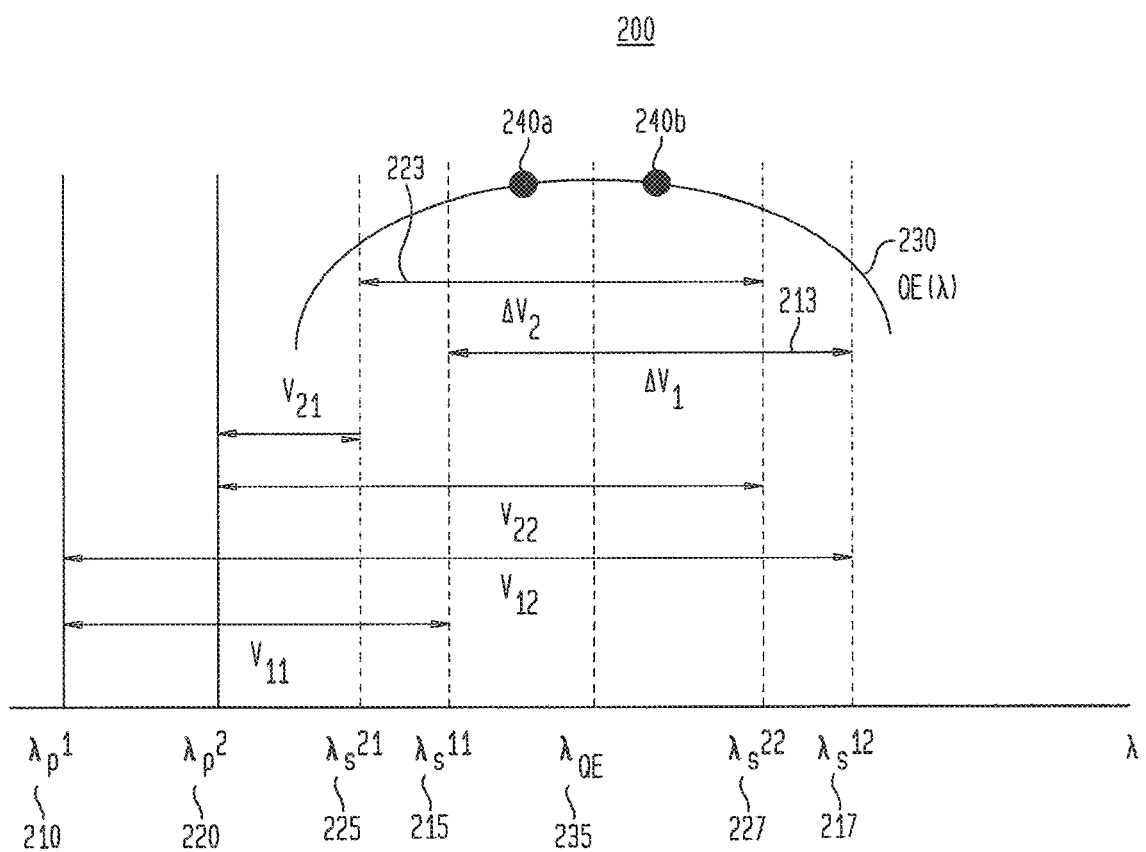
FIG. 2 illustrates a graphical representation for the selection of laser wavelengths in a dual-wavelength Raman probe in accordance with the principles of the invention.

FIG. 2 illustrates an example of the determination of Fingerprint and Stretch regions of a spectrum that may be excited by two separate wavelengths such that the two resultant Stokes signal spectra can be detected using a single detector array in a compact spectrometer.

In accordance with the principles of the invention, the two probe wavelengths designated as $\lambda_p^1$ 210 and $\lambda_p^2$ 220 excite the Stretch and Fingerprint regions of the Raman spectrum, respectively. In this illustrated case, the second excitation wavelength $\lambda_p^1$ is of a shorter wavelength than the first excitation wavelength $\lambda_p^2$ 220.

Further illustrated is an exemplary wavelength range associated with a Fingerprint region, $\Delta v_2$, 223 expressed in wavenumbers. The illustrated Fingerprint region 213 is shown as extending from Raman signal wavelengths $\lambda_s^{21}$ 225 to $\lambda_s^{22}$ 227, which are associated with the first excitation wavelength $\lambda_p^2$ 220. Wavelengths $\lambda_s^{21}$ 215 and $\lambda_s^{22}$ 217 are determined from wavelength $\lambda_p^2$ 220 by shifted values $V_{21}$ and $V_{22}$, respectively, wherein shifted values $V_{21}$ and $V_{22}$ may be determined from equation 1, above.

In this illustrated example, Raman signal wavelength $\lambda_s^{21}$ 225 is conventionally shifted 1-2 nm (nanometers) from first excitation wavelength $\lambda_p^2$ 220 to avoid saturating the spectrometer with the backscattered pump light, while Raman signal wavelength $\lambda_s^{22}$ 227 is determined by calculating the wavelength associated with the Fingerprint wavenumber range, $\Delta v_2$ 223:

$$1/\lambda_s^{22} = 1/\lambda_s^{21} + \Delta v_2. \quad (2)$$

Further illustrated is a wavelength range associated with the Raman signal Stretch region, $\Delta v_1$, 213 expressed in wavenumbers. The illustrated Stretch region is shown as extending from Raman signal wavelengths $\lambda_s^{11}$ 215 and $\lambda s^{12}$ 217, which are associated with the second excitation wavelength $\lambda_p^1$ 210. Wavelengths $\lambda_s^{11}$ 215 and $\lambda s^{12}$ 217 are determined from wavelength from $\lambda_p^1$ 210 by shifted values $V_{11}$ and $V_{12}$, respectively, wherein values $V_{11}$ and $V_{12}$ may be determined from equation 1, above.

Accordingly, Raman signal wavelength $\lambda_s^{11}$ 215 is selected to essentially coincide with $\lambda_s^{21}$ 225 so as to enable the detector element of a spectrometer to be utilized for both pump lasers, while Raman signal wavelength $\lambda_s^{12}$ 217 is determined by calculating the wavelength associated with the Stretch wavenumber range, $\Delta v_1$ 213, wherein the difference between $\lambda_s^{11}$ and $\lambda_s^{12}$ define the Stretch region.

$$1/\lambda_s^{12} = 1/\lambda_s^{11} + \Delta v_1. \quad (3)$$

Further shown is an exemplary quantum efficiency curve, $QE(\lambda)$ 230 of the spectrometer to be used for the collection and analysis of the Raman signals generated by the first and second excitation wavelengths.

Accordingly, with a proper selection of the second excitation wavelength $\lambda_p^1$ 210 and the first excitation wavelength $\lambda_p^2$ 220 the generated Raman signals within both the Stretch region and the Fingerprint region may be captured by the detector element of a single spectrometer.

For the purposes of describing the subject matter regarded as the invention to those skilled in the art, the Fingerprint region wavenumber range and Stretch region wavenumber range are approximately equal, i.e., $\Delta v_1 \approx \Delta v_2$, resulting in $\lambda_s^{11} \approx \lambda_s^{21}$ and $\lambda_s^{21} \approx \lambda_s^{22}$.

Furthermore, while second excitation wavelength $\lambda_p^1$ 210 and first excitation wavelength $\lambda_p^2$ 220 may be selected to provide for the capture of both the Fingerprint and Stretch region using a same detector array, the selection of wavelengths $\lambda_p^1$ 210 and $\lambda_p^2$ 220 in accordance with the principles of the invention provides for the enhancement of the analytical performance of the spectrometer.

Figure 3A:
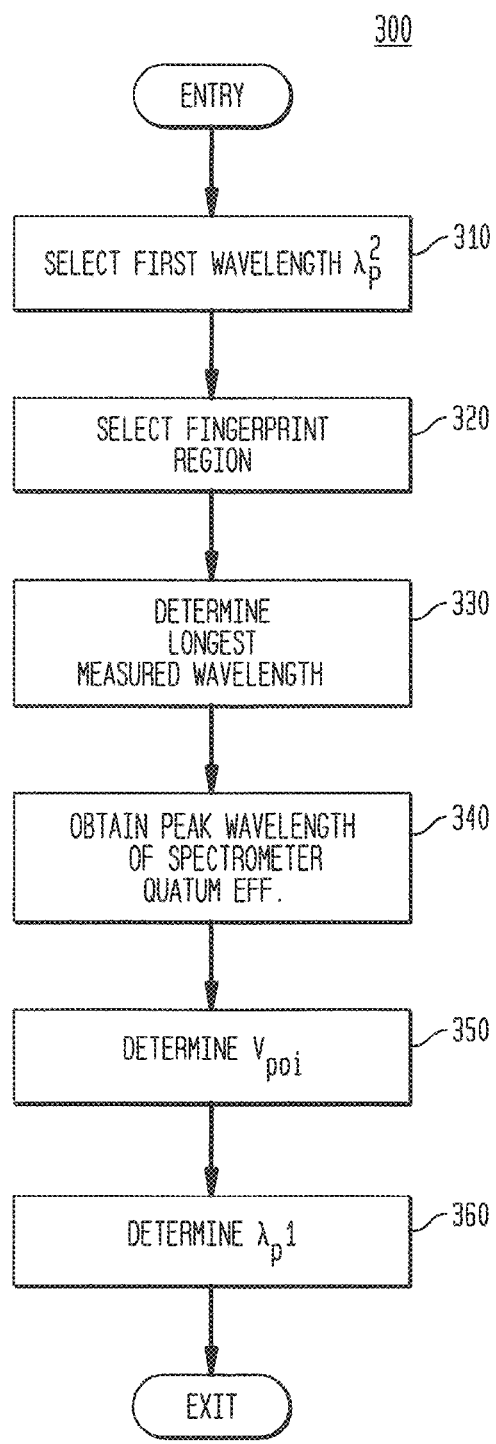
FIG. 3A illustrates a flow chart of an exemplary process for selecting laser wavelengths in a dual-wavelength Raman probe in accordance with the principles of the invention.

FIG. 3 illustrates a flowchart 300 of an exemplary process for determining the wavelengths of a dual-wavelength Raman probe in accordance with the principles of the invention.

In accordance with the principles of the invention, at step 310, a first excitation wavelength (i.e., $\lambda_p^2$) is selected. The first excitation wavelength is associated with the Fingerprint region of the Raman signals reflected or scattered by the target object when illuminated by the first excitation wavelength.

The first excitation wavelength, $\lambda_p^2$, is selected to be as short as possible to mitigate fluorescence of the Raman spectra generated by the inelastic scattering of the first excitation wavelength by the target object. Thus, first excitation wavelength, $\lambda_p^2$, is determined based on the Raman target sample 160 under investigation and its particular fluorescence characteristics when illuminated by the excitation wavelength.

For example, it would be known in the art that a first excitation wavelength, $\lambda_p^2$, for target classes of materials such as heavy petroleum (oil), biological materials, pharmaceutical materials and clear liquids may be selected as 1064 nm, 830 nm, 785 nm, and 532 nm, respectively.

For purpose of teaching the invention claimed, a wavelength such as 785 nm (nanometers) may be selected as the first excitation wavelength, wherein 785 nm is selected to minimize the fluorescence generated by the target object when illuminated by the first excitation wavelength.

The desired range of the Fingerprint region wavenumbers ($\Delta v_2$) is selected based on a desired spectral range and resolution of the spectrometer (e.g., 2000 cm$^{-1}$) at step 320.

The selection of the first excitation wavelength, $\lambda_p^{2'}$ and $\Delta v_2$ defines the longest measured wavelength of the spectrometer ($\lambda_s^{22}$) (step 330) as $$\lambda_s^{22}=1/[\Delta v_2+1/\lambda_p^2] \quad (4)$$

In this exemplary example with the use of a first excitation wavelength, $\lambda_p^2$, of 785 nm, the longest measured wavelength $\lambda_s^{22}$ may be determined from equation 4 above, as 931 nm.

Inspection of the quantum efficiency spectrum associated with the spectrometer to be used in the collection and analysis of the Raman signals may then be performed to determine a peak wavelength of the spectrometer quantum efficiency response, QE($\lambda$), in the determined Fingerprint region (i.e., between wavelength $\lambda_p^2$ (which is approximately equal to $\lambda_s^{21}$) and $\lambda_s^{22}$ (step 340).

The quantum efficiency curve, QE($\lambda$), provides a measure of the efficiency of the spectrometer to collect the Raman signals over a known wavelength band. For example, and for purposes of describing the invention claimed, the quantum efficiency response curve ($\lambda_{QE}$) within the range of the determined Fingerprint region may be determined from current measurements or previous measurements of the response characteristics of the spectrometer.

For example, and for the purpose of describing the invention claimed to those skilled in the art, and with reference to FIG. 2, a peak (maximum) quantum efficiency ($\lambda_{QE}$) 235 of the quantum efficiency response curve 230 within the determined Fingerprint region 223 may be determined. For the purpose of teaching the invention claimed, the peak quantum efficiency in this illustrated example may be determined to be 800 nm.

The Raman shifted peak of interest ($v_{poi}$) may then be determined for the specific chemical compound under investigation (i.e., target object) at step 350. For example, and for the purposes of describing the invention claimed to those skilled in the art, a Raman shifted peak of interest for a specific target object may be determined to be associated with a wavenumber of 3000 cm$^{-1}$.

The second excitation wavelength ($\lambda_p^1$) for quantitative analysis in the Stretch region may then be determined at step 360 as:

$$\lambda_p^1=1/[v_{poi}+1/\lambda_{QE}] \quad (5)$$

Accordingly, the second excitation wavelength, ($\lambda_p^1$) may be determined based on the Raman shift peak of interest, which is associated with the specific target object and the peak quantum efficiency of the spectrometer within the Fingerprint region, which is defined by the selection of the first excitation wavelength.

From the exemplary wavelength selected as the first excitation wavelength ($\lambda_p^2$) 220, for the exemplary Raman shifted peak of interest ($v_{poi}$) of 3000 cm$^{-1}$ and the peak quantum efficiency ($\lambda_{QE}$) 235, a second excitation wavelength ($\lambda_p^1$) 210 may be determined as 645 nm.

As would be appreciated, the selection of the second excitation wavelength in the manner disclosed in equation 5 provides for a coincidence of the Raman peak of interest wavelengths with the peak wavelength ($\lambda_{QE}$) of the spectrometer quantum efficiency within the Fingerprint region.

Hence, the analysis of the Raman signals associated with the second excitation wavelengths is performed at, or substantially close to, the peak quantum efficiency of the spectrometer which results in better analytical performance of the target object.

Although the selection of the second excitation wavelength is determined based of the peak quantum efficiency, as expressed in equation 5, and the most significant spectra performance may be achieved when the determined second excitation wavelength is coincident with the peak quantum efficiency, it would be recognized that a non-peak quantum efficiency value may similarly be utilized to determine the second excitation wavelength. That is, in accordance with the principles of the invention, the term "peak" as used with regard to the term "peak quantum efficiency" need not be the "peak" or maximum value as used in the ordinary and customary sense. Rather the term "peak" as used herein is considered to be a range about the maximum (or peak) value of spectra quantum efficiency. For example, the range may be defined by a range of +/−10 percent of the wavelength number of the maximum value of the spectra quantum efficiency. Similarly, the range may be defined as +/−15 percent of the wavelength number of the maximum value of the spectra quantum efficiency. In another example, the range may be defined as the wavelength numbers within 3 dB of the maximum value of the spectra quantum efficiency. See for example, FIG. 2, wherein points 240a, 240b represent the 3 db (or half-power) points with respect to the peak quantum efficiency 235. In accordance with another aspect of the invention, the specific range may be determined by a desired increase in the signal-to-noise ratio of the received Raman spectra.

Accordingly, the determination of a second excitation wavelength based on equation 5 may be more generally expressed as:

$$\lambda_p^1=1/[v_{poi}+1/(\lambda_{QE}+(+/-\delta))] \quad (6)$$

where δ represents a range about the maximum (peak) quantum efficiency value.

Thus, in accordance with the principles of the invention, the term "peak" is considered to be one of: the maximum value of the response spectra of the spectrometer and a range about the maximum value of the response spectra of the spectrometer.

Figure 3B:
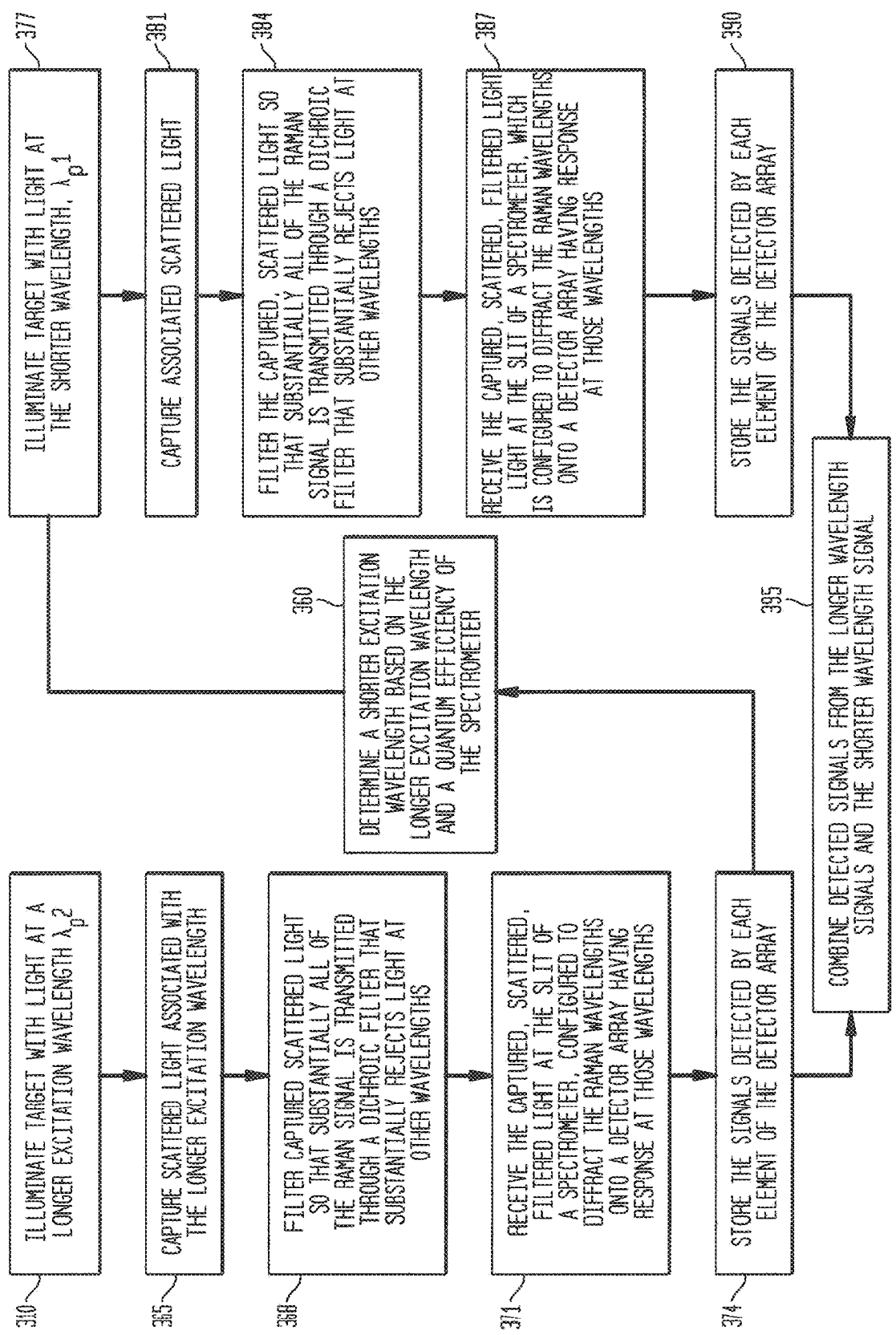
FIG. 3B illustrates a flow chart of an exemplary process associated with a dual-wavelength Raman probe in accordance with the principles of the invention.

FIG. 3B illustrates an exemplary process for operating a dual-wavelength Raman probe in accordance with the principles of the invention.

In accordance with the principles of the invention, a first spectral Raman component generated by the excitation of the target object by a first excitation wavelength, is captured, filtered, received, processed and stored as shown in steps 310, 365, 368, 371, 374, respectively. More specifically, a target object is illuminated by a first excitation wavelength (i.e., $\lambda_p^2$), which has been selected to minimize the fluorescence generated by the target object when illuminated by the first excitation wavelength. The Raman scattered light reflected or scattered by the target object is captured at step 365. The Raman scattered light is then filtered at step 368 and provided to the spectrometer at step 371. At step 374, a spectral analysis performed on the reflected or scattered signals provided to the spectrometer are then stored at step 374.

At step 360, a second excitation wavelength (i.e., $\lambda_p^1$) is determined based on the first excitation wavelength and the quantum efficiency of the spectrometer within the Fingerprint region determined based on the first excitation wavelength, as discussed above.

In accordance with the principles of the invention, after a determination of the second excitation wavelength based on equation 5 above, is made, an evaluation of the determined second excitation wavelength may be made with regard to wavelength performance of conventional laser devices in order to determine a suitability of using conventional lasers having known wavelength output.

That is, the wavelengths of one or more selected conventional lasers may be evaluated with regard to equation 6 to determine which of the one or more selected conventional lasers may be used in place of specially designed lasers that output a wavelength based on equation 5.

A second Raman component generated by the excitation of the target object 160 by the determined second excitation wavelength, is captured, filtered, received, processed, and stored as shown in steps 377, 381, 384, 387, 390, respectively. Specifically, the target object 160 is illuminated by the second excitation wavelength at step 377. The scattered or reflected Raman wavelengths associated with the second excitation wavelength are captured (step 381) and filtered at step 384. At step 387, the Raman wavelengths are provided to the spectrometer and at step 390, the results of a spectral analysis performed by the spectrometer are stored.

At step 395, the first and second Raman spectral component data are concatenated, or combined together, wherein the first Raman spectral component may be used to determine an identification of a compound of the target object 160, while the second Raman spectral component may be used to determine a concentration of the compound of the target object. Alternatively, the first and second Raman spectral may be processed independently to provide a more detailed analysis of the target object.

The selection of the first and second excitation wavelengths in accordance with the principles of the invention provides for enhanced quantitative analysis as the Raman spectrum coincides (or substantially coincides) with a peak of the quantum efficiency of the spectrometer within the Fingerprint region. The increased signal-to-noise ratio of the received Raman signals caused by the coincidence of the Raman signal with the peak of quantum efficiency of the spectrometer provides for an increase in the distinguishing features of the target object (or the component under analysis within the target object).

Accordingly, the dual-laser Raman Probe described herein provides opportunities to monitor, for example, a pharmaceutical bioreactor (i.e., a sealed vessel in which bacteria are grown in an aqueous liquid). In another aspect, an H Stretch band may be used as a calibration standard against which CH and NH Stretch bands to be monitored. For example, the CH and NH Stretch bands may be used to determine changes in proteins within a pharmaceutical bioreactor as proteins are generated by a bacteria and food (carbohydrates) are consumed. In accordance with another application of the dual-laser Raman probe disclosed herein, a concentration of an additive may be determined by calibration using the Raman signal of pure water.

FIGS. 4A and 4B illustrate a typical silicon detector quantum efficiency curve (FIG. 4A) and a corresponding table (FIG. 4B) illustrating the expected quantum efficiency vs. wavenumber for a first Raman pump laser source for a 300 nm wavelength dispersion range.

Referring to FIG. 4A, which illustrates an exemplary quantum efficiency vs. wavenumber, and the efficiency associated with the wavelength shift associated with a 785 nm pump laser source, a wavelength shift of the 785 nm excitation wavelength associated with a 200 cm$^{-1}$ wavenumber provides for a quantum efficiency of 96%, whereas a wavelength shift associated with a 3600 cm$^{1}$ wavenumber provides for an efficiency of 1%. Hence, an analysis of the Raman shifted wavelength associated with a 785 nm excitation wavelength at a 200 cm$^{-1}$ is significantly better than an analysis of a Raman shifted wavelength, associated with a 785 nm excitation wavelength, at a 3600 cm$^{-1}$, as the performance of the spectrometer is significantly greater for the Raman shifted wavelength at 200 cm$^{-1}$.

FIG. 4B tabulates the quantum efficiency for spectrometer efficiency associated with a 785 nm excitation wavelength for different wavelength shifts.

FIGS. 5A and 5B illustrate the efficiency improvement and a corresponding table obtained for the selection of excitation wavelengths, in accordance with the principles of the invention.

In accordance with the principles of the invention, selection of the second excitation wavelength (e.g., 680 nm), based on the first wavelength and the spectral efficiency of the spectrometer, provides for a quantum efficiency of 90 percent at 200 cm$^{-1}$ whereas a wavelength shift associated with a 3600 cm$^{-1}$ wavenumber provides a quantum efficiency of 82%. Hence, the selection of the second excitation wavelength in accordance with the principles of the invention provides significant improvement of the analysis of the Raman signals.

Hence, selection of the dual excitation wavelengths through the matching of the peak of the quantum efficiency curve to a particular wavenumber band of interest, in accordance with the principles of the invention, provides for an enhancement in the signal processing capability of the spectrometer.

An example, of the selection of the first and second excitation wavelengths may be determined as follows:

| | Wavenumberp2 (cm−1) |
|---|---|
| $\lambda_p^2$ - Fingerprint Laser Wavelength (nm) which is approximately $\lambda_s^{21}$ (nm) | |
| 1064 | 9398.496241 |
| Δv2 - Delta Wavelength Target (cm−1) | |
| 2000 | |
| $\lambda_s^{22}$ = QE Range Limit (nm) | |
| 1351.626016 | 7398.496241 |
| QE Peak Wavelength (nm) | (cm−1) |
| 1100 | 9090.909091 |
| Raman Peak of Interest (cm−1) | |
| 3000 | |
| $\lambda_p^1$ - Concatenation Excitation Wavelength (nm) | |
| 827.0676692 | 12090.90909 |

Accordingly, a selection of a second excitation wavelength of 827.0676692 nm in accordance with the principles of the invention provides an improved, enhanced, signal-to-noise ratio in the Raman signal analyzed.

Furthermore, with the enhanced Stretch band signal, the entire enhanced Stretch band may be used for additional data as input for chemometrics algorithms or as orthogonal data to validate of data from the Fingerprint region.

For example, the Raman probe excitation wavelength selection method described, herein, may have use in medical diagnostics as fats and proteins may be monitored using the CH and NH bands and water using the OH band.

Analysis of the CH and NH bands, with the improved or enhanced signal analytical performance described, herein, may help diagnose inflammation or other pathological conditions.

The Raman probe excitation wavelength selection method described, herein, may have use in pharmaceutical process analytics for compound grown in water ($H_2O$) as analysis of such compounds using near-infrared (NIR) spectroscopy is not effective.

The Raman probe excitation wavelength selection method described, herein, may have use to analyze petrochemicals as CH bands are important and where water is generally a contaminant.

Generally speaking, the invention encompasses the use of a device as described herein in medical diagnostics and in analyses associated with petrochemical processing or bioreactors.

Figure 6B:
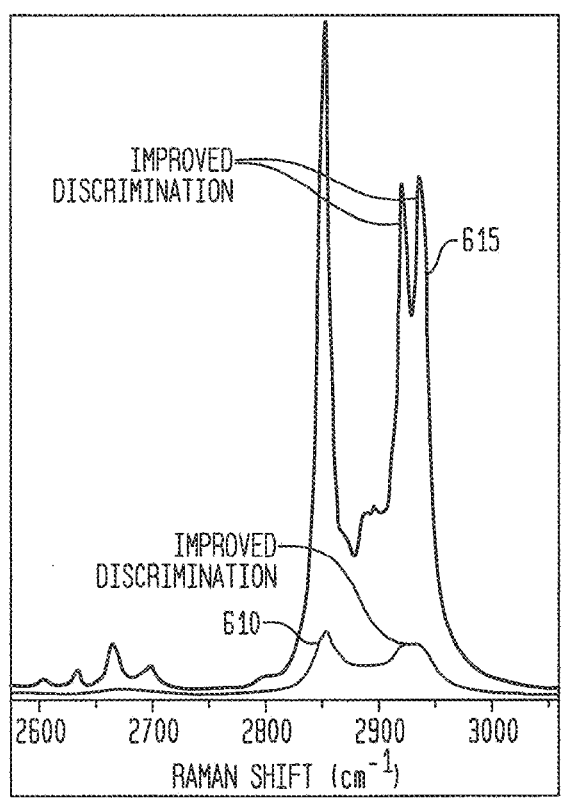
FIG. 6B illustrates an expanded section of the spectral analysis shown in FIG. 6A.

FIGS. 6A and 6B illustrate an examples of the enhancement of Raman signal processing using a wavelength laser pump source in the Stretch band region in accordance with the principles of the invention for cyclohexane.

Specifically, FIG. 6A illustrates the spectral analysis associated with the Fingerprint region and the Stretch region associated with a target object including cyclohexane. FIG. 6B illustrates an expanded version of the Stretch region shown in FIG. 6A.

FIG. 6A illustrates two Raman spectra 610 and 615, wherein spectra 610 is obtained using a 785 nm wavelength laser excitation signal and spectra 615 is obtained using a first excitation wavelength of 785 nm and a second excitation wavelength of 680 nm, wherein the 680 nm wavelength is selected in accordance with the principles of the invention disclosed herein.

In accordance with the principles of the invention, dual-wavelength Raman probe technology disclosed, herein, enables new applications in the process automation market. For example, the use of -H Stretch region vs. Fingerprint region may provide for improved quantitative measurement of changes in concentration or predictive quantitation of concentration. For example, the dual-wavelength Raman probe with the wavelength selection as presented, herein, may be directly applicable to enhance the analysis of:

% petroleum products in water
% contaminants in water
% sugar in water
% protein in water
% sugar/protein vs. time in a biopharma process reaction
Identification of bacteria byproduct (e.g., are you producing what you want?)
Ratio intensity of one set of peaks vs another (e.g., reduces complexity of system calibration)
Monitoring the Intensity of one or multiple peaks over time.
Higher sensitivity due to reduction in noise floor (increased S/N)
Optimizing the Raman band of interest and the quantum efficiency of the detector (e.g., amplifying of the signal of Alkyne bands)
Pass/fail analysis (e.g., Identifying the presence or lack thereof of specific bands).

In summation, a dual-wavelength Raman probe system comprising first and second excitation wavelengths impinge upon a target object and the reflected or scatted wavelength by the target object are collected and analyzed by a spectrometer. In accordance with the principles of the invention, the excitation wavelengths are selected based on the target object and the quantum efficiency (or within a known range) of the spectrometer in order to improve the signal to noise ratio of the Raman signals by having the Raman signals substantially coincide with the peak quantum efficiency of the spectrometer. Collection of the Raman signals substantially coincident with the peak quantum efficiency of the spectrometer provides for an improved signal to noise ratio of the Raman signal.

Although the invention has been described with regard to "a wavelength" emitted by the laser source or operated on by the Raman and Rayleigh scattering it would be recognized that the term "a wavelength" is a term of art and refers to a wavelength or a band of wavelengths around a nominal desired wavelength. The invention has been described with reference to specific embodiments. One of ordinary skill in the art however appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention. Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or' refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A diagnostic system comprising:
  a spectrometer, said spectrometer comprising:
    a known quantum efficiency; and
  a Raman Probe device configured to:
    provide Raman light wavelengths to said spectrometer, said Raman light wavelengths being generated in response to an excitation light illuminating a target object, wherein said excitation light comprises at least one of a first light comprising a first excitation wavelength, $\lambda_p^2$ and a second light comprising a second excitation wavelength, $\lambda_p^1$, said first excitation wavelength selected based on at least one characteristic of said target object and said second excitation wavelength determined based on said first excitation wavelength and a wavelength associated with substantially a peak value of said known quantum efficiency, said Raman probe device comprising:
    a first lens configured to:
      focus said first light and said second light onto said target object; and
    a filter configured to:
      pass said Raman light wavelengths to said spectrometer; and
      block said first excitation wavelengths and said second excitation wavelengths from passing to said spectrometer.

2. The system of claim 1, wherein said second excitation wavelength is determined as:

$$\lambda_p^1 = 1/[v_{poi} + 1/\lambda_{QE}]$$

wherein $\lambda_{QE}$ is said wavelength associated with substantially said peak of said known quantum efficiency within a range defined by the first excitation wavelength; and $v_{poi}$ is the Raman shifted peak of interest for the target object.

3. The system of claim 1, wherein said first lens is configured to:
  collect said Raman light wavelengths and
  provide said collected Raman light wavelengths to said filter.

4. The system of claim 1, comprising:
  a second lens, said second lens configured to:
    collect said Raman light wavelengths, and
    provide said Raman light wavelengths to said filter.

5. The system of claim 4, comprising:
  an optical device comprising: at least one transmissive optical fiber configured to:
    receive said first light and said second light; and
    direct said received first light and said second light to said target object; and
  a plurality of optical fibers configured to:
    receive said Raman light wavelengths; and
    direct said received Raman light wavelengths to said second lens.

6. The system of claim 5, comprising:
  a mask, wherein said mask prevents selected ones of said plurality of receptive optical fibers from receiving said Raman light wavelengths.

7. The system of claim 5, wherein:
  said plurality of receptive optical fibers are arranged in one of: a 1-dimensional array of optical fibers and a 2-dimensional array of fiber optical fibers.

8. The system of claim 5, wherein said optical device comprises:
  a plurality of optical fibers arranged annularly about a center optical core, wherein said center optical core is one of: said at least one transmissive optical fiber and said plurality of receptive optical fibers.

9. The system of claim 1, wherein said at least one characteristic of the target object is associated with a fluorescence generated by said target object when illuminated by said first light.

10. The system of claim 1, wherein said first light and said second light are emitted concurrently.

11. The system of clam 1, wherein said first light and said second light are emitted sequentially.

12. The system of claim 1, comprising:
  a first laser configured to:
    generate said first light, wherein said first laser is one of: internal to said Raman probe device and external to said Raman probe device; and
  a second laser configured to:
    generate said second light, wherein said second laser is one of: internal to said Raman probe device and external to said Raman probe device.

13. A Raman Probe device comprising:
  a first lens, said first lens configured to:
    receive at least one of:
      a first excitation wavelength $\lambda_p^2$, said first excitation wavelength determined based on at least one characteristic of a target object and
      a second excitation wavelength $\lambda_p^1$;
    focus said at least one of said first excitation wavelength and said second excitation wavelength onto said target object, wherein a Raman wavelength is generated in response to said target object being illuminated by a corresponding one of at least one of:
      said first excitation wavelength and said second excitation wavelength; and
  a filter, said filter configured to:

pass said Raman wavelength generated in response to said target object being illuminated by a corresponding one of at least one of:
said first excitation wavelength and said second excitation wavelength, to a spectrometer,
wherein said spectrometer comprises:
a known quantum efficiency and said second excitation wavelength is determined as:

$$\lambda_p^1 = 1/[v_{poi} + 1/\lambda_{QE}]$$

wherein $\lambda_{QE}$ is a wavelength associated with a peak of said quantum efficiency within a range defined by the first excitation wavelength; and
$v_{poi}$ is the Raman shifted peak of interest for the target object.

14. The Raman Probe device of claim 13, wherein said first lens is configured to:
collect said Raman wavelength; and
present said collected Raman wavelength to said filter.

15. The Raman Probe device of claim 13, comprises:
a second lens, said second lens configured to:
collect said Raman wavelength; and
present said collected Raman wavelength to said filter.

16. The Raman Probe device of claim 15 comprising:
an optic device comprising:
a plurality of optical fibers, wherein selected ones of said optical fibers receive said first excitation wavelength and said second excitation wavelength; and
selected ones of said optical fibers receive said Raman light wavelengths.

17. The Raman Probe device of claim 16, wherein said plurality of optical fibers are arranged in one of: a matrix configuration and an annular configuration.

18. The Raman Probe device of claim 13, comprising:
a first laser source configured to:
emit said first excitation wavelength; and
a second laser source configured to:
emit said second excitation wavelength, wherein at least one of said firstlaser source and said second laser source is: external to said Raman Probe and internal to said Raman Probe.

19. The Raman Probe device of claim 13, wherein said first excitation wavelength and said second excitation wavelength are emitted one of: concurrently and sequentially.

* * * * *